(12) United States Patent
Hwang et al.

(10) Patent No.: US 11,240,559 B2
(45) Date of Patent: Feb. 1, 2022

(54) CONTENT REPRODUCING APPARATUS AND CONTENT REPRODUCING METHOD

(71) Applicant: SAMSUNG ELECTRONICS CO., LTD., Suwon-si (KR)

(72) Inventors: Sungjun Hwang, Suwon-si (KR); Jiyeon Ma, Suwon-si (KR); Youngah Lee, Suwon-si (KR); David McGeorge, Chelmsford (GB); Jonathan Reza Burrow, London (GB); Zanya Damaris Fahy, London (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/735,986

(22) Filed: Jan. 7, 2020

(65) Prior Publication Data

US 2020/0221176 A1   Jul. 9, 2020

(30) Foreign Application Priority Data

Jan. 7, 2019   (KR) .................. 10-2019-0001923

(51) Int. Cl.
*H04N 21/442* (2011.01)
*H04N 21/485* (2011.01)
*H04N 21/45* (2011.01)

(52) U.S. Cl.
CPC . *H04N 21/44218* (2013.01); *H04N 21/44222* (2013.01); *H04N 21/4532* (2013.01); *H04N 21/4852* (2013.01)

(58) Field of Classification Search
CPC ......... H04N 21/44218; H04N 21/4852; H04N 21/4532; H04N 21/44222
See application file for complete search history.

(56) References Cited

U.S. PATENT DOCUMENTS

| 8,850,466 B2 | 9/2014 | Beskrovny |
| 8,949,871 B2 | 2/2015 | Chai et al. |
| 2008/0016544 A1* | 1/2008 | Lee .................. H04N 21/4333 |
| | | 725/134 |
| 2011/0314491 A1* | 12/2011 | Delidais ............. H04N 21/4348 |
| | | 725/23 |

(Continued)

FOREIGN PATENT DOCUMENTS

| CN | 110366036 A | 10/2019 |
| KR | 10-2013-0000532 | 1/2013 |
| KR | 10-2016-0035381 | 3/2016 |

OTHER PUBLICATIONS

International Search Report and Written Opinion dated Apr. 23, 2020 in counterpart International Patent Application No. PCT/KR2020/000280.

*Primary Examiner* — Yassin Alata
(74) *Attorney, Agent, or Firm* — Nixon & Vanderhye P.C.

(57) ABSTRACT

A content reproducing apparatus is provided. The content reproducing apparatus includes: a communicator configured to periodically transmit and receive a connection signal with a terminal; a content outputter configured to output content; a memory configured to store one or more instructions; and a processor configured to execute the one or more instructions stored in the memory to control the content outputter to adjust the output of the content, based on a distance to the terminal being greater than a certain distance, the distance being obtained based on the connection signal.

15 Claims, 10 Drawing Sheets

(56) References Cited

U.S. PATENT DOCUMENTS

2014/0152899 A1\* 6/2014 Newell .............. H04N 21/4415
                                                     348/734
2016/0162252 A1   6/2016 Di Censo et al.
2016/0366468 A1\* 12/2016 Seo .................... G06F 3/04842
2017/0285788 A1  10/2017 Park et al.

\* cited by examiner

CONTENT REPRODUCING APPARATUS AND CONTENT REPRODUCING METHOD

CROSS-REFERENCE TO RELATED APPLICATION

This application is based on and claims priority under 35 U.S.C. § 119 to Korean Patent Application No. 10-2019-0001923, filed on Jan. 7, 2019, in the Korean Intellectual Property Office, the disclosure of which is incorporated by reference herein in its entirety.

BACKGROUND

1. Field

The disclosure relates to a content reproducing apparatus and a content reproducing method, and for example, to a method and an apparatus for adjusting output of content according to a situation occurring to a user.

2. Description of Related Art

Users may watch content through various devices, such as televisions (TVs), personal computers (PCs), tablets, and mobile phones. When a watching interruption situation occurs while a user is watching content on a device, the user misses the content output through the device until the watching interruption situation is ended. In order not to miss the content output after the watching interruption situation occurs, the user has to perform an action of requesting watching stop, such as pressing a pause button separately.

When the watching interruption situation is ended after the user performs the action of requesting the watching stop, the user has to request watching continuation, such as pressing a play button, so as to use the content again.

SUMMARY

Embodiments of the disclosure provide a method and an apparatus for detecting a situation occurring to a user and adjusting output of content.

Additional aspects will be set forth in part in the description which follows and, in part, will be apparent from the description.

According to an example embodiment of the disclosure, a content reproducing apparatus includes: a communicator configured to periodically transmit and receive a connection signal with a terminal; a content outputter configured to output content; a memory configured to store one or more instructions; and a processor configured to execute the one or more instructions stored in the memory to control the content outputter to adjust the output of the content based on a distance to the terminal being greater than a certain distance, wherein the distance is obtained based on the connection signal.

The content outputter may include: a display configured to output an image included in the content; and an audio outputter configured to output audio included in the content, and the processor may be further configured to execute the one or more instructions to adjust the output of the content by controlling the display or the audio outputter to pause the output of the image or increase volume of the audio.

The processor may be further configured to execute the one or more instructions to identify that the distance to the terminal is greater than the certain distance based on the connection signal not being received from the terminal for a certain time or based on a strength of the connection signal received from the terminal being weaker than certain strength.

The processor may be further configured to execute the one or more instructions to control the content outputter to output the content as before the output of the content is adjusted based on the distance to the terminal being less than the certain distance within a reference time after the distance to the terminal is greater than the certain distance.

The processor may be further configured to execute the one or more instructions to identify that the distance to the terminal is less than the certain distance based on the connection signal being received from the terminal or the strength of the connection signal received from the terminal being greater than or equal to certain strength.

The processor may be further configured to execute the one or more instructions to control the content outputter to end the output of the content based on the distance to the terminal not being less than the certain distance within a reference time after the distance to the terminal is greater than the certain distance.

The processor may be further configured to execute the one or more instructions to control the content reproducing apparatus to transmit, to the terminal, information about the content being output based on the distance to the terminal being greater than the certain distance, such that some of a plurality of terminals access the content and subsequently output the content.

The processor may be further configured to execute the one or more instructions to control the content reproducing apparatus to receive information about a content reproduction time point from the terminal based on the distance to the terminal being less than the certain distance within a reference time after the distance to the terminal is greater than the certain distance, and to output the content after a point of the content that has been output by the terminal.

The processor may be further configured to execute the one or more instructions to control the content reproducing apparatus to, based on there being a plurality of terminals that periodically transmit and receive the connection signal, adjust the output of the content only based on distances to all the plurality of terminals being greater than the certain distance.

The processor may be further configured to execute the one or more instructions to, based on distances to some of the plurality of terminals being greater than the certain distance, transmit, to some of the plurality of terminals having distances to the terminal greater than the certain distance, information about the content that is being output, such that some of the plurality of terminals access the content to output the content and simultaneously continue to output the content.

According to another example embodiment of the disclosure, a content reproducing method includes: periodically transmitting and receiving a connection signal with a terminal; outputting content; identifying whether a distance to the terminal is greater than a certain distance based on the connection signal; and adjusting output of the content based on the distance to the terminal being greater than the certain distance.

According to another example embodiment of the disclosure, a non-transitory computer-readable recording medium having recorded thereon a program for performing a content reproducing method is provided, the content reproducing method including: periodically transmitting and receiving a connection signal with a terminal; outputting content; identifying whether a distance to the terminal is greater than a certain distance based on the connection signal; and adjusting output of the content based on the distance to the terminal being greater than the certain distance.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
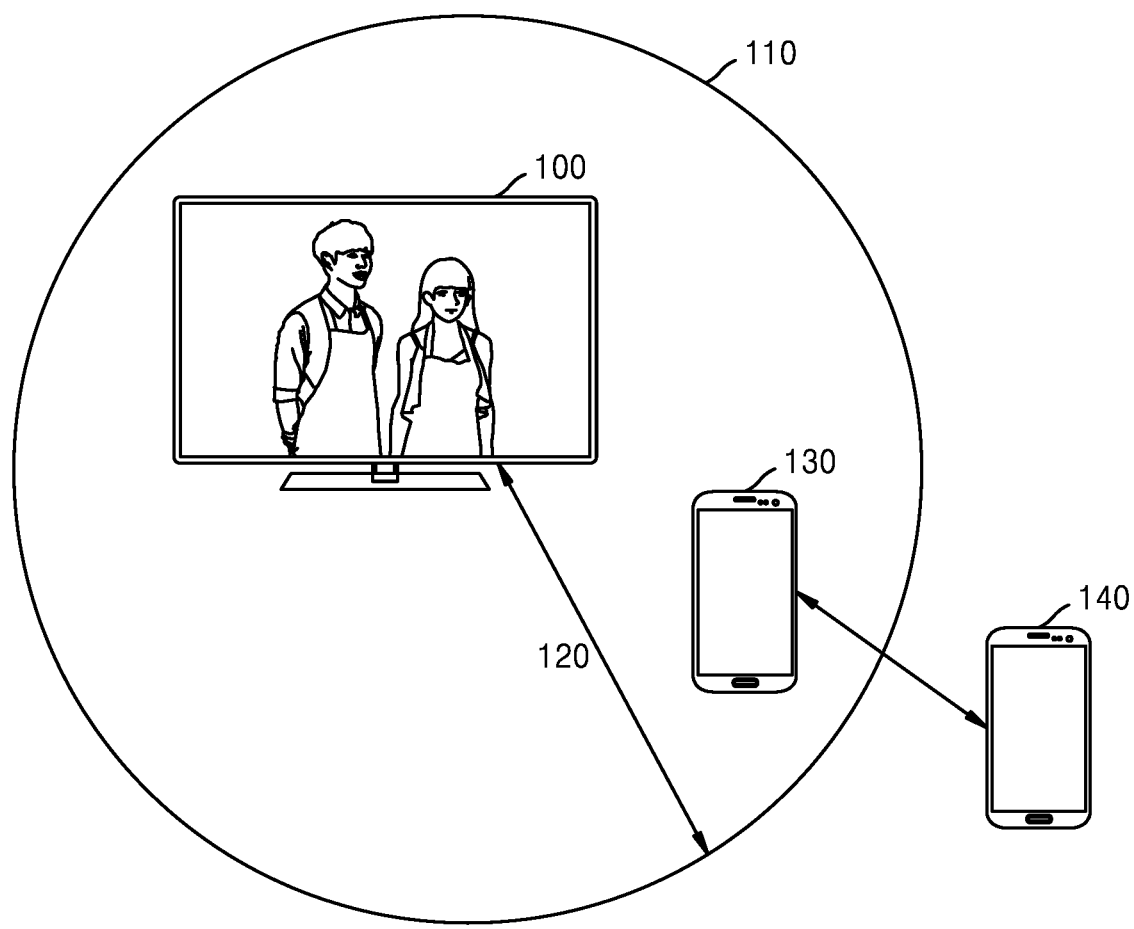
FIG. 1 is a diagram illustrating casein example in which a content reproducing apparatus detects a watching interruption situation occurring to a user, according to an embodiment of the disclosure.

Hereinafter, various example embodiments of the disclosure will be described in greater detail with reference to the accompanying drawings. However, the disclosure may be embodied in many different forms and is not limited to the various example embodiments of the disclosure described herein.

The terms used herein are those general terms currently widely used in the art in consideration of functions described in the disclosure, but the terms may vary according to the intention of those of ordinary skill in the art, precedents, or new technology in the art. Thus, the terms used herein should be understood not as simple names but based on the overall description of the disclosure.

The terms used herein are for the purpose of describing example embodiments of the disclosure and are not intended to limit the scope of the disclosure.

It will be understood that when a region is referred to as being "connected to" or "coupled to" another region, it may be directly connected or coupled to the other region or intervening regions may be present. It will be understood that terms such as "comprise", "include", and "have", when used herein, specify the presence of stated elements, but do not preclude the presence or addition of one or more other elements.

The use of the term "the" and a similar definite term in the disclosure (in particular, in the claims) are to be construed to cover both the singular and the plural. In addition, operations of all methods described herein may be performed in any suitable order unless otherwise clearly indicated herein. The disclosure is not limited to the order of the described operations.

The phrases "in some embodiments of the disclosure" or "in an embodiment of the disclosure" appearing in various places in the disclosure do not necessarily refer to the same embodiment of the disclosure.

Some embodiments of the disclosure may be represented by functional block configurations and various processing operations. All or part of such functional blocks may be realized by any number of hardware and/or software components configured to perform particular functions. For example, the functional blocks of the disclosure may be implemented as one or more microprocessors or may be implemented as circuit configurations for certain functions. Furthermore, for example, the functional blocks of the disclosure may be implemented with various programming or scripting languages. The functional blocks may be implemented by algorithms executed on one or more processors. Furthermore, the disclosure may employ any conventional techniques for electronics configuration, signal processing and/or data processing. The terms "mechanism," "element," and "configuration" are used in a broad sense and are not limited to mechanical or physical configurations.

Furthermore, the connecting lines or connecting members illustrated in the drawings are intended to represent example functional connections and/or physical or logical connections between elements. It should be noted that many alternatives or additional functional connections, physical connections or logical connections may be present in a practical apparatus.

Furthermore, the terms "unit" and "module" used herein represent a unit for processing at least one function or operation, which may be implemented by hardware, software, or a combination of hardware and software.

Throughout the disclosure, the expression "at least one of a, b or c" indicates only a, only b, only c, both a and b, both a and c, both b and c, all of a, b, and c, or variations thereof.

Hereinafter, the disclosure will be described in greater detail with reference to the accompanying drawings.

FIG. 1 is a diagram illustrating an example in which a content reproducing apparatus detects a watching interruption situation occurring to a user, according to an embodiment of the disclosure.

Referring to FIG. 1, a user may watch a television (TV) 100 in a space where it is possible to watch the TV 100. In FIG. 1, an example in which the content reproducing apparatus is the TV 100 will be described as an example, but embodiments of the disclosure are not limited thereto.

The term "user" used in an embodiment of the disclosure may refer, for example, to a person who controls the functions or operations of the TV 100 and terminals 130 and 140, and may include a viewer, an administrator, or an installation engineer, but the disclosure in not limited to these particular users.

When a watching interruption situation occurs while the user is watching the TV 100, the user may temporarily or completely move to a space where it is impossible to watch the TV 100. For example, when watching the TV 100 in a living room where the TV 100 is installed, the user may have to move to another room or go out. When the user moves while carrying the terminal 140, the terminal 140 also moves to a space where it is impossible to watch the TV 100.

When the user leaves the space where it is possible to watch the TV 100, the user may not perform an action of pausing the TV 100 or turning off the power of the TV 100. In this case, the user misses content output from the TV 100 until the user returns to the space where it is possible to watch the TV 100.

In order to address this problem, in an embodiment of the disclosure, the TV 100 may periodically transmit and receive signals with the terminals 130 and 140 to detect whether the terminals 130 and 140 move away from the TV 100. The TV 100 may be in a state of being already connected to the terminals 130 and 140 located nearby through a communication network. The TV 100 may determine whether the terminals 130 and 140 are out of a proximity area 110 by periodically exchanging a connection signal with the connected terminals 130 and 140. The proximity area 110 may be a reference area used when the TV 100 determines whether the watching interruption situation has occurred in the terminals 130 and 140. The proximity area 110 may refer, for example, to an area that is within a certain proximity distance 120 from the TV 100.

For convenience of description, when the user is located within the proximity area 110 where it is possible to watch the TV 100 and the terminal carried by the user is also located within the proximity area 110, the terminal is denoted by reference numeral 130, and when the user is located out of the proximity area 110 and the terminal is also located out of the proximity area 110, the terminal is denoted by reference numeral 140.

In an embodiment of the disclosure, the TV 100 may periodically generate a signal for searching for a device located in a space using ultrasonic waves, such as, for example, and without limitation, Bluetooth Low Energy (BLE), or the like. For example, the TV 100 may continuously transmit a first connection signal to the surroundings to check whether the device connected to the TV 100 is located within a proximity distance from the TV 100.

When the terminals 130 and 140 are located near the TV 100, the terminals 130 and 140 may receive the first connection signal from the TV 100. After receiving the first connection signal from the TV 100, the terminals 130 and 140 may transmit a second connection signal to the TV 100 indicating the reception of the first connection signal. The second connection signal may, for example, be a type of response signal that, after receiving the first connection signal, the terminals 130 and 140 transmit to the TV 100 having transmitted the first connection signal. The TV 100 and the terminals 130 and 140 may periodically exchange the first connection signal and the second connection signal so as to confirm that a data link between the TV 100 and the terminals 130 and 140 is operating well.

When the terminal 130 receiving the first connection signal transmits the second connection signal to the TV 100 within a certain time, the TV 100 may determine that the terminal 130 is located within the proximity area 110. When the terminal 140 does not transmit the second connection signal indicating the reception of the first connection signal to the TV 100 within the certain time, the TV 100 may determine that the terminal 140 is out of the proximity area 110.

In an embodiment of the disclosure, when the TV 100 periodically transmits the first connection signal to the terminals 130 and 140 and then receives the second connection signal confirming the reception of the first connection signal from the terminals 130 and 140 within the certain time, the TV 100 may identify whether the terminals 130 and 140 are located within the proximity area 110, based on the strength of the second connection signal. For example, based on the strength of the second connection signal received from the terminal 140 being weaker than certain strength, the TV 100 may identify that the terminal 140 has left the proximity area 110.

In an embodiment of the disclosure, the TV 100 may measure a distance between the TV 100 and the terminals 130 and 140 based on the strength of the second connection signal. The TV 100 may identify whether the terminals 130 and 140 are located within the proximity area 110 using the distance to the terminals 130 and 140 that is measured based on the strength of the second connection signal.

When the TV 100 determines that the terminal 140 is out of the proximity area 110, the TV 100 may determine that an event such as a watching interruption situation occurs to the user and may adjust output of content. In an embodiment of the disclosure, the TV 100 may adjust the volume of content that is being output. For example, when the TV 100 detects that the terminal 140 is out of the proximity area 110 and the event has occurred to the user, the TV 100 may increase the volume of the content to output a loud audio sound. For example, when the content output from the TV 100 is a live broadcast such as a terrestrial broadcast signal, the TV 100 may increase the volume of the content that is being output, so that the user hears the sound of the TV 100 from far away. Therefore, the user may use the audio output from the TV 100 even when the user is far away from the TV 100.

In an embodiment of the disclosure, the TV 100 may start recording the content that is being output. When the content is a live broadcast, the TV 100 may record the content output through the TV 100 after detecting that an event has occurred to the user.

In an embodiment of the disclosure, the TV 100 may pause the content that is being output. When the watching interruption situation occurs and the user is far away from the TV 100 so that it is impossible for the user to watch the TV 100, the TV 100 may pause the content that is being output.

In an embodiment of the disclosure, the TV 100 may pause the content and transmit, to the terminal 140, information about the content that is being output. The information about the content may include at least one of a content identifier such as a title of the content that is being output, content access information indicating a storage location of the content, or information about a reproduction time point of the content that is being output. The storage location of the content may include information about a server providing content. The terminal 140 may use the content identifier and the content access information, which are received from the TV 100, to access the server providing content and output content having a certain identifier. In addition, the terminal 140 may use the information about the reproduction time point of the content to output the content after a time point when the TV reproduces the content.

Therefore, even when the user is far away from the TV 100, the user may continue to watch the content using the terminal 140.

When the terminal 140 enters the proximity area 110 again within a certain time after the terminal 140 leaves the proximity area 110, the TV 100 may detect that the event has ended in the terminal 130 and output the content as before the output of the content is adjusted. For example, based on the TV 100 receiving the second connection signal from the terminal 130 within a certain time after detecting that the event has occurred in the terminal 140, the strength of the second connection signal is greater than a certain reference value, or the distance to the terminal 130, which is measured according to the second connection signal, is within the proximity distance 120, the TV 100 may identify that the terminal 130 is located within the proximity area 110 and determine that the event has ended.

After detecting the end of the event, the TV 100 may adjust the audio volume back again based on the detection, so that the user uses the content output from the TV 100 at the original audio volume, or may reproduce only the content while the content recording is stopped. The TV 100 may output the recorded and stored content on the screen while continuing to record the content, so that the user reuses the content from the time point when the user is out of the proximity area 110.

The TV 100 may resume the output of the paused content. For example, when the content is Internet broadcast provided through a service such as Video On Demand (VOD) or Over The Top (OTT), the TV 100 may pause the content that is being output according to the occurrence of the event, and may reproduce the paused content again when the end of the event is detected.

In an embodiment of the disclosure, after the TV 100 detects the occurrence of the event, when the terminal 140 transmits the information about the content to the terminal 140, such that the terminal 140 subsequently outputs the content, and then the event is ended in the terminal 130, the terminal 130 may transmit, to the TV 100, information about the reproduction time point of the content that is being output through the terminal 130. The TV 100 may use the information about the content reproduction time point received from the terminal 130 to start content reproduction subsequently from a time point after the terminal 130 has output the content.

After the terminal 140 leaves the proximity area 110, when the TV 100 does not enter the proximity area 110 again even after a certain time has elapsed, the TV 100 may determine that the user will no longer watch the TV 100 due to the user's going out or the like, and may stop outputting the content. In this case, the TV 100 may output a home screen set as a default. In an embodiment of the disclosure, the TV 100 may be turned off and no longer operate.

Accordingly, even when the user does not separately end the content or does not perform an action of turning off the TV 100, or the like, the TV 100 that detects the occurrence of the watching interference situation may end the content or turn off the power of the TV 100.

Figure 2:
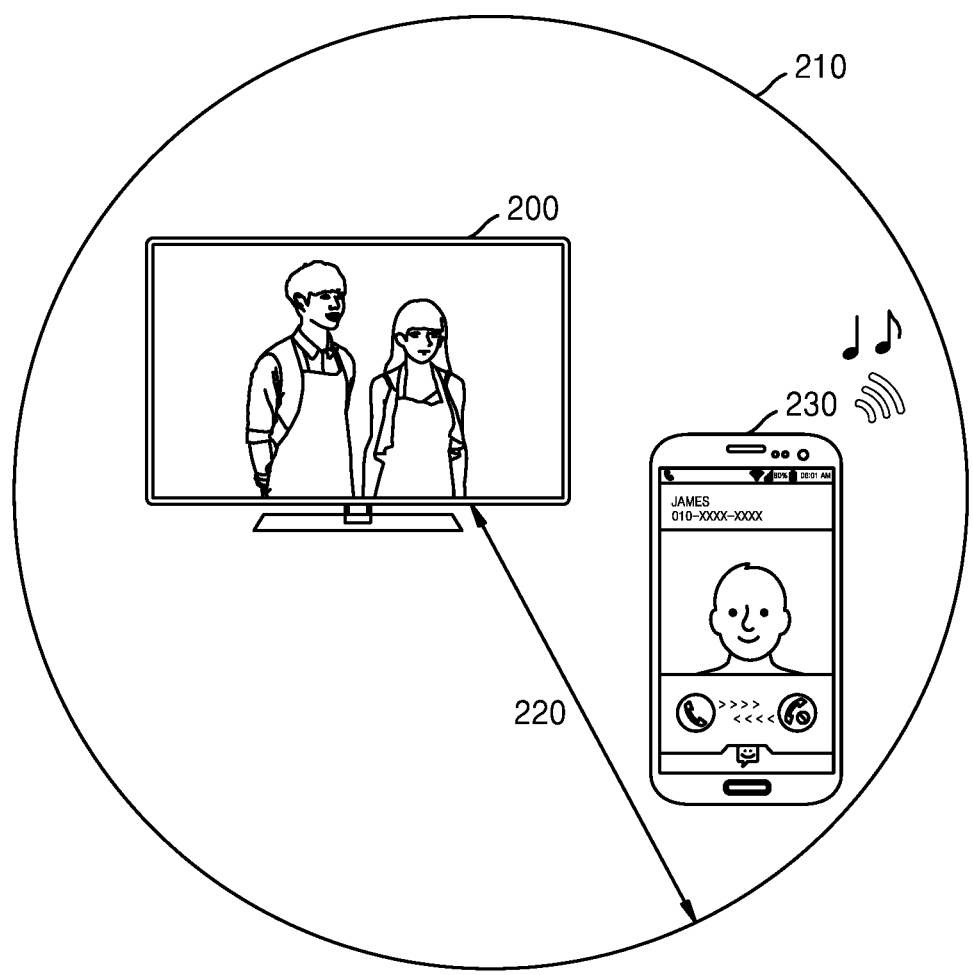
FIG. 2 is a diagram illustrating an example in which a content reproducing apparatus detects a watching interruption situation occurring to a user, according to another embodiment of the disclosure.

FIG. 2 is a diagram illustrating an example in which a content reproducing apparatus detects a watching interruption situation occurring to a user, according to another embodiment of the disclosure.

Referring to FIG. 2, a user may watch content output from a TV 200 while carrying a terminal 230 in a space where it is possible to watch the TV 200. For example, it is assumed that the user is watching the TV 200 in a proximity area 210 within a proximity distance 220 while carrying the terminal 230. As described above with reference to FIG. 1, the TV 200 may be in a state of being connected to the terminal 230 located nearby through a communication network.

In an embodiment of the disclosure, when the watching interference situation occurs, for example, when a call comes to the terminal 230 located within the proximity area 210, the user may temporarily or completely move to a space where it is impossible to watch the TV, while carrying the terminal 230. In this case, as described above with reference to FIG. 1, the TV 200 may detect the occurrence of the event and adjust output of content. However, in another embodiment of the disclosure, when a call comes to the terminal 230 while the user is watching the TV 200, the user may make a phone call while being located within the proximity area 210. In this case, the user may have no time to execute a function of pausing the content output from the TV 200, decreasing the volume of the content, or the like.

In an embodiment of the disclosure, when an event such as a call coming occurs, the terminal 230 may transmit an event occurrence signal to the TV 200 connected thereto. When the TV 200 receives the event occurrence signal from the terminal 230, the TV 200 detects the occurrence of the event, and increases the volume of the content that is being output, or outputs only silent video on the screen.

When the user ends the phone call using the terminal 230 within a certain time, the terminal 230 may transmit, to the TV 200, an event end signal indicating the end of the event. When the TV 200 receives the event end signal from the terminal 230, the TV 200 may detect the end of the event that has occurred in the terminal 230. The TV 200 may increase the volume of the content back again or resume the output of the paused content according to the end of the event.

When the user continues the phone call using the terminal 230 after the occurrence of the event so that the TV 200 does not receive the event end signal from the terminal 230 within the certain time, the TV 200 may completely end the content that is being output or may turn off the power of the TV 200 and no longer operate.

Figure 3:
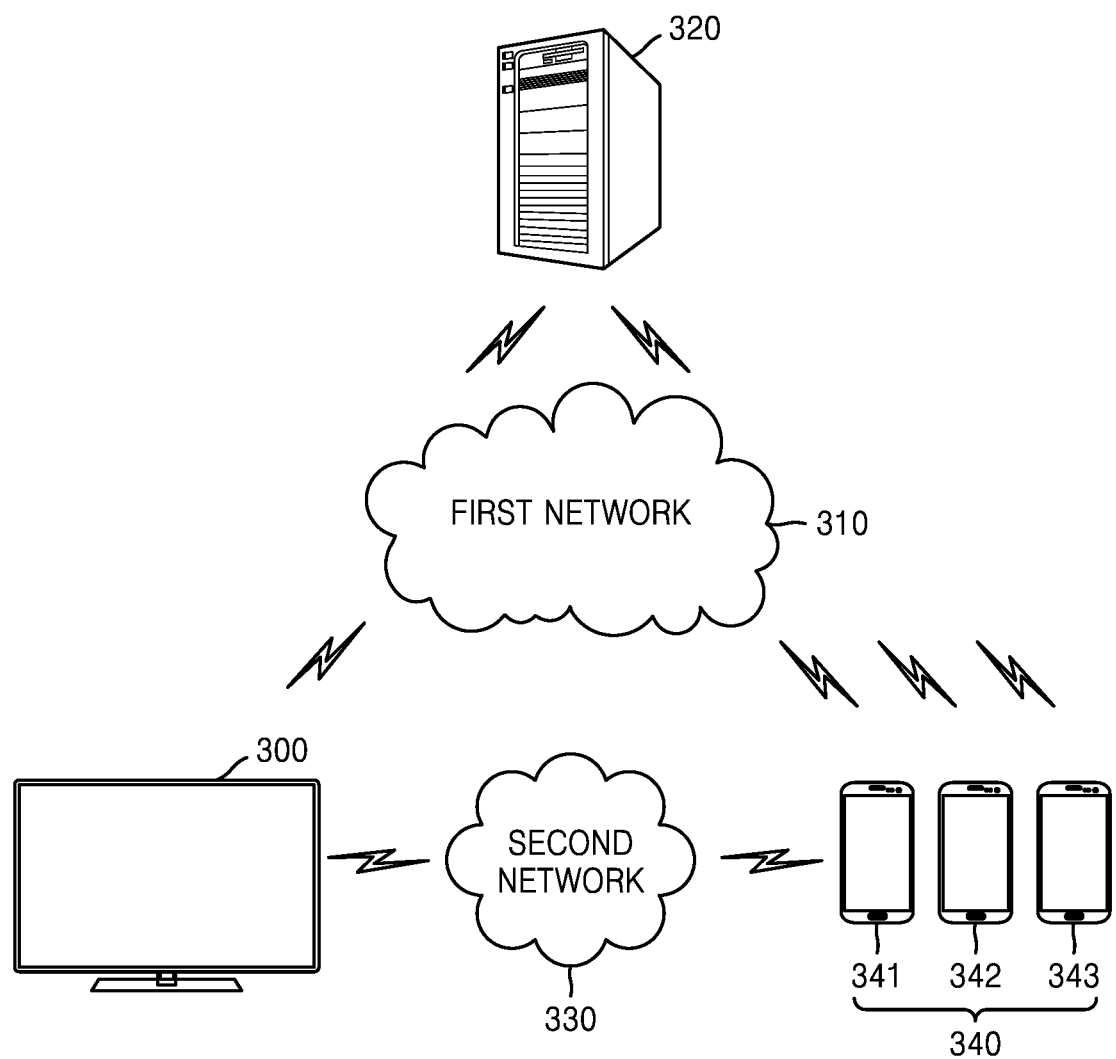
FIG. 3 is a diagram illustrating an example system in which a content reproducing apparatus detects occurrence of an event in a terminal and adjusts output of content, according to an embodiment of the disclosure.

FIG. 3 is a diagram illustrating an example system in which a content reproducing apparatus 300 detects occurrence of an event in a terminal 340 and adjusts output of content, according to an embodiment of the disclosure.

Referring to FIG. 3, the system may include the content reproducing apparatus 300, a server 320, the terminal 340, a first network 310, and a second network 330.

The content reproducing apparatus 300 may output a variety of content selected by a user. The content reproducing apparatus 300 may be a TV. For example, the content reproducing apparatus 300 may, for example, and without limitation, be implemented as a digital TV, a 3D-TV, a smart TV, an LED TV, an OLED TV, a plasma TV, or the like. However, embodiments of the disclosure are not limited thereto, and the content reproducing apparatus 300 may be implemented as an electronic apparatus including a display. For example, and without limitation, the content reproducing apparatus 300 may be implemented as a monitor, a set-top box, or the like, but embodiments of the disclosure are not limited thereto.

The content reproducing apparatus 300 may include not only a flat display apparatus, but also a curved display apparatus that is a screen having a curvature, or a flexible display apparatus having an adjustable curvature. The output resolution of the content reproducing apparatus 300 may include, for example, a high resolution (HD), full HD, ultra HD, or a resolution higher than ultra HD.

The server 320 may, for example, be a computing apparatus including a communicator (e.g., including communication circuitry) and a processor (e.g., including processing circuitry) and capable of providing content. The server 320 may be a server or an electronic apparatus that supplies content. The server 320 may be a broadcasting station server, a content provider server, a content storage device, or the like, which is capable of transmitting certain content to the content reproducing apparatus 400.

The server 320 may include a terrestrial broadcasting station. In this case, the content reproducing apparatus 300 may output content received from the terrestrial broadcasting station on the screen in real time. The server 320 may include a server such as an internet broadcasting station. For example, the server 320 may be a server maintained by a content provider, such as, for example, and without limitation, Netflix, Amazon, Tying, or Kootv. The content reproducing apparatus 300 may output content requested by the user from the server 320 using a service such as VOD or OTT. The server 320 may provide a variety of content to the content reproducing apparatus 300 and the terminal 340 through the first network 310.

The content may include, for example, and without limitation, videos, audios, texts, images, games, applications, and the like. The content may be stored in a memory (not illustrated) inside the content reproducing apparatus 300, or may be stored in a server 320 connected through the first network 310. The content reproducing apparatus 300 may output content stored in an internal memory, or may receive content from the server 320 and output the received content.

The terminal 340 may be an electronic apparatus carried by the user and may be implemented as various electronic apparatuses. The terminal 340 may include, for example, and without limitation, at least one of a smartphone, a tablet PC, a mobile phone, a video phone, an e-book reader, a laptop PC, a netbook computer, a personal digital assistant (PDA), a portable multimedia player (PMP), an MP3 player, a wearable device, a smart watch, or the like. In an embodiment of the disclosure, the terminal 340 may be singular or plural. For example, when the terminal 340 is a plurality of terminals 341, 342, and 343, each of the terminals 341, 342, and 343 may transmit and receive signals with the server 320 and the content reproducing apparatus 300 using the first network 310 and the second network 330.

Each of the content reproducing apparatus 300 and the terminal 340 may access the server 320 through the first network 310, receive content from the server 320, and reproduce the received content. The first network 310 may be a telecommunications network. The communication network may include at least one of a computer network, Internet, Internet of things (IoT), or a telephone network.

The content reproducing apparatus 300 and the terminal 340 may transmit and receive signals with each other through the second network 330. In an embodiment of the disclosure, the content reproducing apparatus 300 may be connected to the terminal 340 through the second network 330. The content reproducing apparatus 300 may periodically transmit a connection signal to the terminal 340 through the second network 330.

The connection signal may include a first connection signal transmitted from the content reproducing apparatus 300 to the terminal 340, and a second connection signal indicating that the terminal 340 has received the first connection signal.

The second network 330 may include at least one of communication networks, such as, for example, and without limitation, Bluetooth or Wi-Fi, BLE, infrared communication, and laser beam communication, etc.

Bluetooth is a wireless technology standard used to exchange data or voice in a short range. This technology is widely used to transfer data, audio and video between devices such as smartphones, notebooks, PC peripherals, and earphones. The BLE technology operates on the same spectrum as the existing Bluetooth technology, but uses different channels. While the Bluetooth technology uses 79 channels each having a bandwidth of 1 MHz, the BLE technology uses 40 channels each having a bandwidth of 2 MHz and solves narrowband interference using frequency hopping. The BLE enables ultra-low power connectivity and basic data transfer. Because BLE may consume a very low level of power and may realize a low power consumption in a pure sense, the BLE may be effectively used to enable the content reproducing apparatus 300 and the terminal 340 to always operate, either in a standby mode or in a normal mode.

The content reproducing apparatus 300 may identify whether the distance to the terminal 340 is within a certain distance or greater than the certain distance, according to the connection signal transmitted and received with the terminal 340 through the second network 330. The content reproducing apparatus 300 may determine proximity to the terminal 340. When the proximity is less than or equal to a certain value, that is, when the distance between the content reproducing apparatus 300 and the terminal 340 is greater than the certain distance, the content reproducing apparatus 300 may detect that an event has occurred in the terminal 340 and adjust output of content.

In addition, the content reproducing apparatus 300 may identify whether the distance to the terminal 340 is less than the certain distance within a reference time from a time point when the distance to the terminal 340 is greater than the certain distance. The reference time may be a preset time interval after a time point when the distance to the terminal 340 is identified to be greater than the certain distance. Based on the proximity to the terminal 340 becoming greater than or equal to the certain value within the reference time, that is, the distance between the content reproducing apparatus 300 and the terminal 340 is within the certain distance, the content reproducing apparatus 300 may adjust the content back again and output the adjusted content.

Based on the proximity to the terminal 340 not increasing beyond the certain value even after the reference time has elapsed since the terminal 340 moved, that is, the distance between the content reproducing apparatus 300 and the terminal 340 is not less than the certain distance, the content reproducing apparatus 300 may completely stop outputting the content.

In another embodiment of the disclosure, when an event such as a phone call occurs, the terminal 340 may generate an event occurrence signal and transmit the event occurrence signal to the content reproducing apparatus 300 through the second network 330. In addition, when the event ends, for example, when the phone call ends, the terminal 340 may generate an event end signal and transmit the event end signal to the content reproducing apparatus 300 through the second network 330. The content reproducing apparatus 300 may detect whether the event has occurred in the terminal 340 or whether the event has ended in the terminal 340 using the event occurrence signal and the event end signal received from the terminal 340. Accordingly, the content reproducing apparatus 300 may adjust the output of the content or adjust the already adjusted state to the original state, and output the content. The content reproducing apparatus 300 may completely end the output of the content when the end of the event is not detected even after the certain time has elapsed since the event occurred.

In an embodiment of the disclosure, when the terminal 340 is plural, the content reproducing apparatus 300 may detect whether an event has occurred in each of the terminals 341, 342, and 343 and whether an event has ended in each of the terminals 341, 342, and 343. In an embodiment of the disclosure, the content reproducing apparatus 300 may adjust the output of the content only when the content reproducing apparatus 300 detects that an event has occurred in all of the terminals 341, 342, and 343. That is, when an event does not occur in any of the terminals 341, 342, and 343, the content reproducing apparatus 300 may continue to output the content. For example, it is assumed that a father, a mother, and a child watch content through the content reproducing apparatus 300 in a living room while carrying the terminals 341, 342, and 343, respectively.

When the father and the child move to a main room and a nursery room, respectively, and only the mother remains in the living room, the content reproducing apparatus 300 may identify that the distance between the father's terminal 341 and the child's terminal 342 is greater than a certain distance. However, because the terminal 343 carried by the mother does not deviate from the certain distance, the content reproducing apparatus 300 continues to output the content for the user of the terminal 343 who uses the content.

In an embodiment of the disclosure, the content reproducing apparatus 300 may transmit information about the content to the father's terminal 341 and the child's terminal 342, in which the event has occurred, through the second network 330. The information about the content may include at least one of an identifier for identifying the content that is being output, access information, or information about a content reproduction time point. The terminals 341 and 342 may directly access the server 320, which provides the content output by the content reproducing apparatus 300, through the first network 310 using the information about the content. The terminals 341 and 342 may receive, from the server 320, content output by the content reproducing apparatus 300 from a certain time point and subsequently reproduce the content on the screen without interruption. In this case, the content reproducing apparatus 300 continues to output the content, and the terminal 341 and 342, which move away from the content reproducing apparatus 300 due to the occurrence of the event, also reproduce the same content. Therefore, the father, the mother, and the child may all use the content without missing the content.

Figure 4:
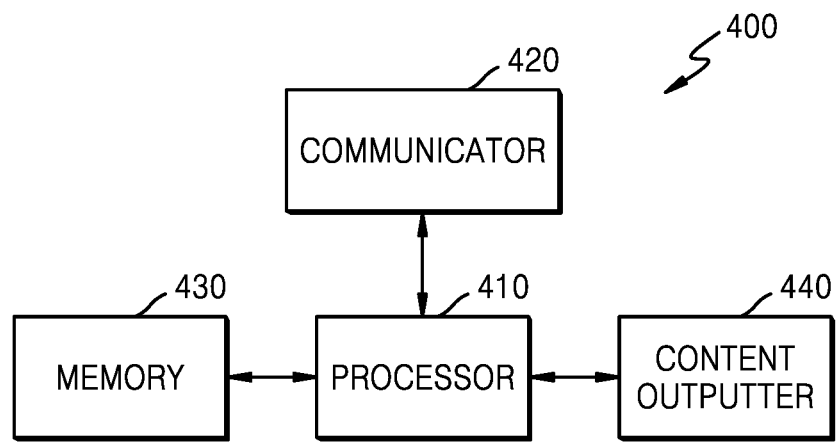
FIG. 4 is a block diagram illustrating an example configuration of a content reproducing apparatus, according to an embodiment of the disclosure.

FIG. 4 is a block diagram illustrating an example configuration of a content reproducing apparatus 400, according to an embodiment of the disclosure.

The content reproducing apparatus 400 may include a processor (e.g., including processing circuitry) 410, a communicator (e.g., including communication circuitry) 420, a memory 430, and a content outputter (e.g., including output circuitry)_440.

The content reproducing apparatus 400 may reproduce content such as audios, videos, or texts. The content reproducing apparatus 400 may be controlled by various types of control devices (not illustrated), such as a remote controller or a mobile phone, which control the content reproducing apparatus 400. When the display (not illustrated) of the content reproducing apparatus 400 is implemented as a touch screen, the content reproducing apparatus 400 may be controlled by a user's finger, an input pen, or the like. When the content reproducing apparatus 400 performs a voice recognition function, the content reproducing apparatus 400 may be controlled by a user's voice.

The communicator 420 may include at least one communication module including various communication circuitry, such as, for example, and without limitation, a short range communication module, a wired communication module, a mobile communication module, a broadcast reception module, or the like. The at least one communication module may refer, for example, to a tuner configured to perform broadcast reception and a communication module configured to perform data transmission and reception through a network in accordance with a communication standard such as Bluetooth, Wireless LAN (WLAN, Wi-Fi), Wireless Broadband (Wibro), World Interoperability for Microwave Access (Wimax), Code Division Multiple Access (CDMA), or Wideband Code Division Multiple Access (WCDMA).

The communicator 420 may include various communication circuitry and communicate with the server 320 through a wired or wireless network. For example, the communicator 420 may transmit and receive data with the server 320 connected through the wired or wireless network under the control of the processor 410. In an embodiment of the disclosure, the communicator 420 may receive content by accessing the server 320 providing content using at least one of 3G, 3rd Generation Partnership Project (3GPP), 4G, or Wi-Fi.

In addition, the communicator 420 may communicate with the terminal 340 using a short range communication network. In an embodiment of the disclosure, the communicator 420 may transmit and receive a connection signal, an event occurrence signal, an event end signal, or the like with the terminal 340 using at least one of Wi-Fi, Bluetooth, BLE, infrared communication, or laser beam communication.

The processor 410 may include various processing circuitry that may control overall operations of the content reproducing apparatus 400 and detect whether an event has occurred in the terminal 340 or whether an event has ended in the terminal 340 using a signal that the communicator 420 exchanges with the terminal 340. In addition, the communicator 420 may transmit information about the content to the terminal 340. The information about the content may include at least one of a content identifier, content access information, or information about a content reproduction time point. The communicator 420 may receive information about the content reproduction time point from the terminal 340.

The memory 430 may include at least one storage medium selected from among flash memory, hard disk, multimedia card micro type memory, card type memory (for example, SD or XD memory), random access memory (RAM), static random access memory (SRAM), read-only memory (ROM), electrically erasable programmable read-only memory (EEPROM), programmable read-only memory (PROM), magnetic memory, magnetic disk, and optical disk.

In an embodiment of the disclosure, the memory 430 may store a program for processing and control of the processor 410. In addition, the memory 430 may store one or more instructions that are executable by the processor 410. In an embodiment of the disclosure, content may be stored in the memory 430. The content may be divided into audio, video and/or additional information, and the divided audio, video, and/or additional information may be stored in the memory 430 under the control of the processor 410.

The content outputter 440 may include various output circuitry and output content received through the communicator 420. The content outputter 440 may include at least one of a display (not illustrated) outputting an image included in the content or an audio outputter (not illustrated) outputting audio included in the content.

In an embodiment of the disclosure, when the processor 410 detects that an event has occurred in the terminal 340, the processor 410 may control the audio outputter included in the content outputter 440 to increase or decrease the volume of the content or output the silent content. The processor 410 may control the display included in the content outputter 440 to pause an image of the content that is being output and may control the audio outputter to stop the audio output of the content. When the processor 410 detects the end of the event in the terminal 340, the content outputter 440 may adjust the content back again and output the adjusted content according to the control of the processor 410. For example, the content outputter 440 may adjust the volume of the content back again and output the adjusted content, or may output the paused screen again.

The processor 410 may control the overall operation of the content reproducing apparatus 400. For example, the processor 410 may perform the function of the content reproducing apparatus 400 by executing one or more instructions stored in the memory 430. In addition, although one processor 410 is illustrated in FIG. 4, the content reproducing apparatus 400 may further include a plurality of processors (not illustrated). In this case, each operation that is performed by the content reproducing apparatus 400 may be performed through at least one of the processors.

In an embodiment of the disclosure, the processor 410 may store one or more instructions in an internal memory (not illustrated) provided in the processor 410, and may execute one or more instructions stored in the internal memory so as to perform operations to be described below. That is, the processor 410 may perform a certain operation by executing at least one instruction or program stored in the internal memory provided in the processor 410 or the memory 430.

In addition, in an embodiment of the disclosure, the processor 410 may include a graphic processing unit (GPU) (not illustrated) for graphic processing corresponding to video. The processor 410 may be implemented as a system on chip (SoC) in which a core (not illustrated) and a GPU (not illustrated) are integrated. The processor 410 may include a single core, a dual core, a triple core, a quad core, and a multiple core thereof.

The processor 410 may execute one or more instructions stored in the memory 430 or the internal memory so as to detect the situation of the terminal 340 and adjust the output of the content. When the terminal 340 moves away from the content reproducing apparatus 400 or when an event occurs, for example, when the user makes a phone call using the terminal 340, the processor 410 may adjust the output of the content through the content outputter 440 so as to prevent the user from missing content.

In an embodiment of the disclosure, the processor 410 may receive an event occurrence signal from the terminal 340 and detect that an event has occurred in the terminal 340. When the user makes a phone call or receives a phone call using the terminal 340, the terminal 340 may generate an event occurrence signal and transmit the generated event occurrence signal to the content reproducing apparatus 400. The processor 410 may adjust the output of the content according to the reception of the event occurrence signal. In another embodiment of the disclosure, the processor 410 may transmit and receive a connection signal with the terminal 340 and may obtain proximity to the terminal 340 according to the connection signal. When the proximity is less than a preset value, that is, when the terminal 340 moves away from the content reproducing apparatus 400 by a certain distance or more, the processor 410 may detect that an event has occurred in the terminal 340. The processor 410 may adjust the output of the content according to the detection of the event occurrence.

Accordingly, when a situation that interrupts a user's watching occurs, the output of the content is automatically adjusted even when the user does not perform a separate operation.

When the occurrence of the event is detected, the processor 410 may adjust the output of the content by adjusting the volume of the content or pausing the output of the content. In an embodiment of the disclosure, the processor 410 may control the content reproducing apparatus 400 to start recording the content. When an event occurs in the terminal 340, the user may preset a method by which the content reproducing apparatus 400 adjusts the output of the content. A content adjusting method may be set in the content reproducing apparatus 400 by default.

When the processor 410 detects that an event has occurred based on the proximity to the terminal 340, that is, when the terminal 340 moves away from the content reproducing apparatus 400 by a certain distance or more and the processor 410 detects that an event has occurred in the terminal 340, the processor 410 may pause the content reproduction and then transmit information about the output content to the terminal 340. The terminal 340 may receive information about the content and directly access the content using the information about the content. In this case, the terminal 340 may continue to subsequently output the content.

Accordingly, the user may continue to use the content even when the user moves away from the content reproducing apparatus 400.

In an embodiment of the disclosure, when the terminal 340 that periodically transmits and receives the connection signal through the communication network is plural and the occurrence of the event is detected only for some of the terminals, the processor 410 may transmit the information about the output content to the terminal 340 in which the event has occurred, and continues to output the content to the terminal 340 in which no event has occurred.

When the processor 410 detects that the event has ended in the terminal 340 within a certain time after the occurrence of the event, the processor 410 may adjust the output of the content back again and output the adjusted content.

Accordingly, when the event ends, the processor 410 may automatically adjust the output of the content in the same manner as the original output, even when the user does not perform a separate operation, and output the adjusted content.

When the processor receives the event end signal from the terminal 340 within a certain time after the occurrence of the event, the processor 410 may detect the end of the event. In another embodiment of the disclosure, when the proximity to the terminal obtained within a certain time after the occurrence of the event according to the connection signal is greater than or equal to a preset value, the processor 410 may determine that the terminal 340 is located near the content reproducing apparatus 400 and determine that the event has ended.

Accordingly, when the event has ended in the user's terminal 340, the user may continue to watch the content that has been originally used through the content reproducing apparatus 400, without any separate operation.

In the case in which the processor 410 detects the occurrence of the event and transmits, to the terminal 340, the information about the content that is being output, such that the terminal 340 continues to subsequently output the content, when the event ends in the terminal 340 within a certain time after the occurrence of the event, the processor 410 may receive information about a content reproduction time point from the terminal 340. The processor 410 may receive the information about the content reproduction time point and allows the terminal 340 to subsequently output the content after the reproduction time point.

Accordingly, when the user moves away from the content reproducing apparatus 400 and comes back to the proximity area, the content reproducing apparatus 400 outputs the content output through the terminal 340, so that the user may watch the content continuously.

When the processor 410 does not detect that the event has ended in the terminal 340 within a certain time after the occurrence of the event, the processor 410 may completely end the output of the content. When the processor 410 does not receive the event end signal from the terminal 340 within a certain time after the occurrence of the event or when the proximity to the terminal obtained according to the connection signal with the terminal 340 is not within a preset range, the processor 410 may determine that the event has not ended. In this case, the processor 410 may determine that the user no longer wants to use the content, completely end the output of the content, or turn off the power of the content reproducing apparatus 400.

When the event does not end for a certain time after the event occurs in the terminal 340, the user may preset a method by which the content reproducing apparatus 400 ends the output of the content. The method of ending the output of the content may be set in the content reproducing apparatus 400 by default.

Accordingly, when the user goes out or the call time is long, the output of the content may be automatically stopped even when the user does not perform a separate operation.

Figure 5:
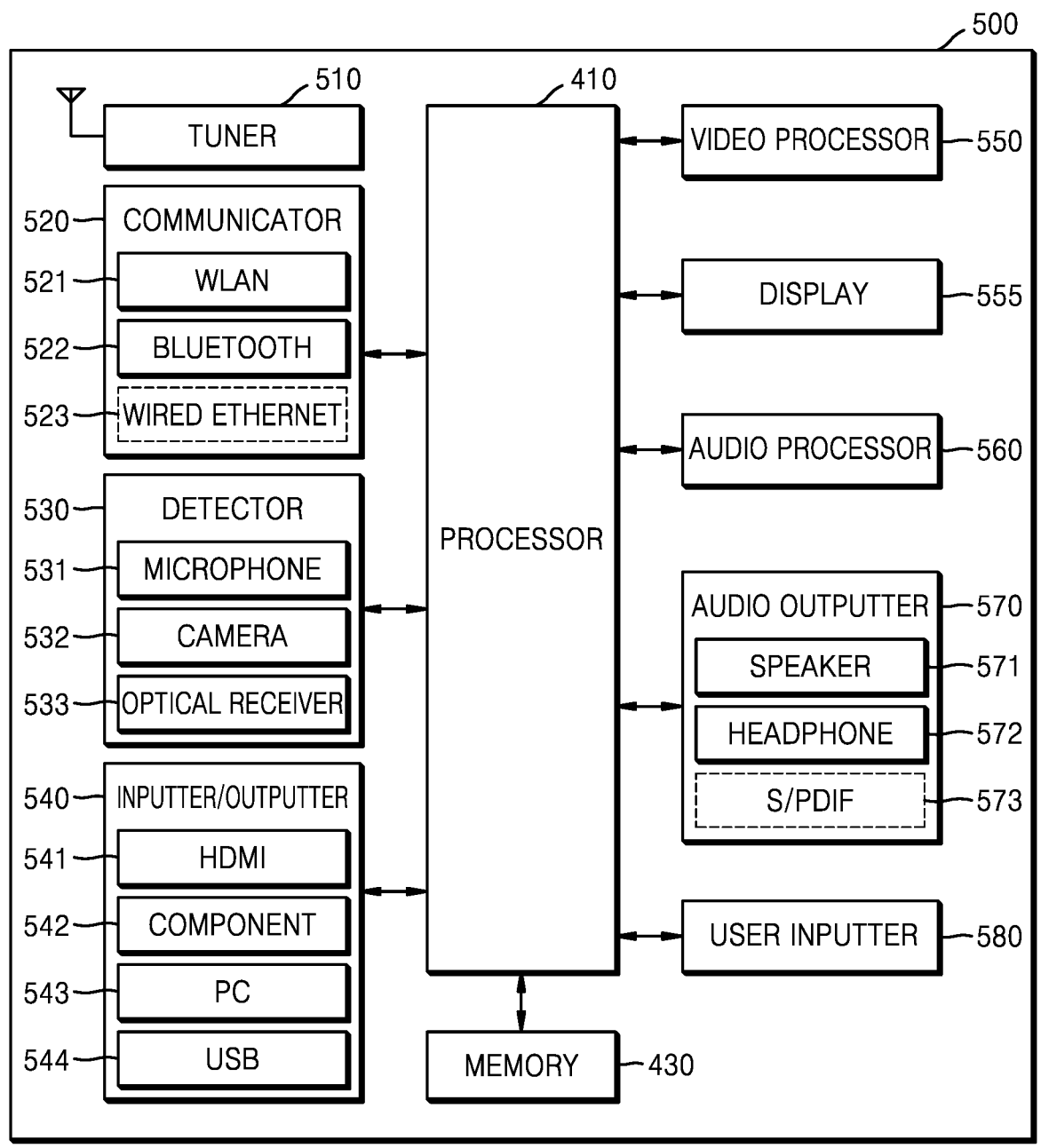
FIG. 5 is a block diagram illustrating an example configuration of a content reproducing apparatus, according to another embodiment of the disclosure.

FIG. 5 is a block diagram illustrating an example configuration of a content reproducing apparatus 500, according to another embodiment of the disclosure.

As illustrated in FIG. 5, the content reproducing apparatus 500 may include a processor (e.g., including processing circuitry) 410, a memory 430, a tuner 510, a communicator (e.g., including communication circuitry) 520, a detector (e.g., including detecting circuitry)(530, an inputter/outputter (e.g., including input/output circuitry) 540, a video processor (e.g., including video processing circuitry) 550, a display 555, an audio processor (e.g., including audio processing circuitry) 560, an audio outputter (e.g., including audio output circuitry) 570, and user inputter (e.g., including user input circuitry) 580.

Because the processor 410 and the memory 430 are the same as those described above with reference to FIG. 4, a redundant description thereof will be not be repeated in FIG. 5. In addition, the communicator 420 described above with reference to FIG. 4 may correspond to at least one of the tuner 510 or the communicator 520 of FIG. 5.

The tuner 510 may tune only a frequency of a channel to be received by the content reproducing apparatus 500 among a lot of propagation components by performing amplification, mixing, resonance, or the like on content received by wire or wirelessly. The content may include a broadcast signal, and the content may include at least one of audio, video as an image signal, or additional information. The additional information may include a location at which the content is stored, a title of the content, and the like. The content may also be referred to as content.

The content received through the tuner 510 may, for example, be decoded (for example, subjected to audio decoding, video decoding or additional information decoding) and divided into audio, video, and/or additional information. The divided audio, video, and/or additional information may be stored in the memory 430 under the control of the processor 410.

The tuner 510 of the content reproducing apparatus 500 may be singular or plural. The tuner 510 may be implemented as an all-in-one with the content reproducing apparatus 500, or may be implemented as a separate device (for example, a set-top box, not illustrated) having a tuner electrically connected to the content reproducing apparatus 500 or a tuner (not illustrated) connected to the inputter/outputter 540.

The communicator 520 may include various communication circuitry and connect the content reproducing apparatus 500 to an external device (for example, the external server 320) under the control of the processor 410. The processor 410 may receive content from the external server 320 connected through the communicator 520, download an application from an external device, or perform web browsing.

The communicator 520 may include communication circuitry corresponding to at least one of a WLAN 521, Bluetooth 522, or a wired Ethernet 523 according to the performance and configuration of the content reproducing apparatus 500. In addition, the communicator 520 may include a combination of the WLAN 521, the Bluetooth 522, and the wired Ethernet 523. The communicator 520 may receive a control signal through a control device (not illustrated) under the control of the processor 410. The control signal may be implemented in a Bluetooth type, an RF signal type, or a Wi-Fi type.

The communicator 520 may further include, in addition to the Bluetooth 522, other short range communications (for example, near field communication (NFC) and BLE, not illustrated). According to an embodiment of the disclosure, the communicator 520 may be connected to the terminal 340 through short range communication such as the Bluetooth 522 or BLE, and may transmit and receive a connection signal.

The communicator 520 may be used to determine whether an event has occurred in the terminal 340 or whether an event has ended in the terminal 340 using at least one of whether the connection signal is received from the terminal 340 or the strength of the connection signal.

The communicator 520 may receive an event occurrence signal or an event end signal from the terminal 340. The communicator 520 may be used to determine whether the event has occurred in the terminal 340 or whether the event has ended in the terminal 340 using the event occurrence signal and the event end signal received from the terminal 340.

The detector 530 may include various detecting circuitry and detect a user's voice, a user's video, or a user's interaction, and may include, for example, a microphone 531, a camera 532, and an optical receiver 533, or the like. The microphone 531 may receive an uttered voice of a user. The microphone 531 may convert the received voice into an electrical signal and output the electrical signal to the processor 410. The microphone 531 according to an embodiment of the disclosure may receive, from the control device, a voice signal corresponding to a channel information request from the user.

The camera 532 may receive an image (for example, a continuous frame) corresponding to a user's motion including a gesture in a camera recognition range. The camera 532 according to an embodiment of the disclosure may receive, from the control device, a user's motion corresponding to content control.

The optical receiver 533 receives an optical signal (including a control signal) from the control device. The optical receiver 533 may receive an optical signal corresponding to a user input (for example, touch, press, touch gesture, voice, or motion) from the control device such as a remote controller or a mobile phone. A control signal may be extracted from the received optical signal under the control of the processor 410.

The inputter/outputter 540 may include various input/output circuitry and receive video (for example, a moving image, a still image, or the like), audio (for example, a voice signal, a music signal, or the like), and additional information (for example, description of content, content title, content storage position, or the like) from the server 320 or the like of the content reproducing apparatus 500 under the control of the processor 410. The inputter/outputter 540 may include, for example, and without limitation, one or more of a high-definition multimedia interface (HDMI) port 541, a component jack 542, a PC port 543, and a universal serial bus (USB) port 544. The inputter/outputter 540 may include a combination of the HDMI port 541, the component jack 542, the PC port 543, and the USB port 544.

The memory 430 according to an embodiment of the disclosure may store instructions and programs for processing and control of the processor 410, and may store data input to the content reproducing apparatus 500 or output from the content reproducing apparatus 500. In addition, the memory 430 may store data necessary for the operation of the content reproducing apparatus 500.

Furthermore, the programs stored in the memory 430 may be divided into a plurality of modules according to the functions thereof. The memory 430 may store one or more programs for identifying the situation of the terminal 340 and performing the content output adjustment operation.

The processor 410 may include various processing circuitry and may control the overall operation of the content reproducing apparatus 500 and the signal flow between the internal elements of the content reproducing apparatus 500 and perform the data processing function. When a user input is received or a prestored condition is satisfied, the processor 410 may execute an operating system (OS) and various applications stored in the memory 430.

The processor 410 according to an embodiment of the disclosure may identify the situation of the terminal 340 and adjust the output of the content by executing one or more instructions stored in the memory 430.

In addition, the processor 410 may include an internal memory (not illustrated). In this case, at least one of data, programs, or instructions stored in the memory 430 may be stored in the internal memory (not illustrated) of the processor 410.

The video processor 550 may include various video processing circuitry and process image data to be displayed by the display 555 and may perform various image processing operations, such as decoding, rendering, scaling, noise filtering, frame rate conversion, and resolution conversion, with respect to image data.

The display 555 may display, on the screen, an image signal included in content received through the tuner 510 under the control of the processor 410. In addition, the display 555 may display content (for example, moving image) input through the communicator 520 or the inputter/outputter 540. The display 555 may output an image stored in the memory 430 under the control of the processor 410.

When the display 555 is implemented as a touch screen, the display 555 may be used as an input device as well as an output device. For example, the display 555 may include, for example, and without limitation, at least one of a liquid crystal display (LCD), a thin film transistor-liquid crystal display (TFT-LCD), an organic light-emitting diode (OLED), a flexible display, a 3D display, or an electrophoretic display. The content reproducing apparatus 400 may include two or more displays 555 according to the implementation form of the content reproducing apparatus 400.

The audio processor 560 may include various audio processing circuitry and processes audio data. The audio processor 560 may perform a variety of processing, such as decoding, amplification, or noise filtering, with respect to audio data.

The audio outputter 570 may include various audio output circuitry and output audio included in the content received through the tuner 510 under the control of the processor 410, audio input through the communicator 520 or the inputter/outputter 540, or audio stored in the memory 430. The audio outputter 570 may include at least one of a speaker 571, a headphone output terminal 572, or a Sony/Phillips digital interface (S/PDIF) output terminal 573. The audio outputter 570 may increase or decrease the volume of the audio signal under the control of the processor 410 that detects the state of the terminal 340. The audio outputter 570 may not output silent audio under the control of the processor 410.

The user inputter 580 may include various user input circuitry and may refer, for example, to a device allowing a user to input data for controlling the content reproducing apparatus 500. The user inputter 580 may be implemented as various types of devices, such as a remote controller or a mobile phone, which control the content reproducing apparatus 500. When the display 555 of the content reproducing apparatus 500 is implemented as a touch screen, the user inputter 580 may be replaced with a user's finger, an input pen, or the like. The user inputter 580 may control the content reproducing apparatus 500 using short range communication including infrared communication or Bluetooth communication. The user inputter 580 may control the function of the content reproducing apparatus 500 using a key pad, a dome switch, a jog wheel, a jog switch, a button, a touchpad, and a motion recognition sensor (not illustrated). In some cases, the detector 530 may perform the function of the user inputter 580. For example, the microphone 531 capable of receiving the user's voice may recognize a user's voice command as a control signal.

The user inputter 580 may include a power on/off button that turns on or off the power of the content reproducing apparatus 500. In addition, the user inputter 580 may perform channel change, volume control, terrestrial broadcast/cable broadcast/satellite broadcast selection, or environment setting of the content reproducing apparatus 500 according to a user input. In addition, the user inputter 580 may be a pointing device. For example, the user inputter 580 may operate as a pointing device when receiving a specific key input.

The block diagrams of the content reproducing apparatuses 400 and 500, illustrated in FIGS. 4 and 5, are block diagrams for an embodiment of the disclosure. Each element of the block diagrams may be integrated, added, or omitted according to the specification of the content reproducing apparatus that is actually implemented. For example, when necessary, two or more elements may be integrated into one element, or one element may be subdivided into two or more elements. Furthermore, the function performed by each block is provided for describing the embodiments of the disclosure, and a specific operation or device thereof does not limit the scope of the disclosure.

Figure 6:
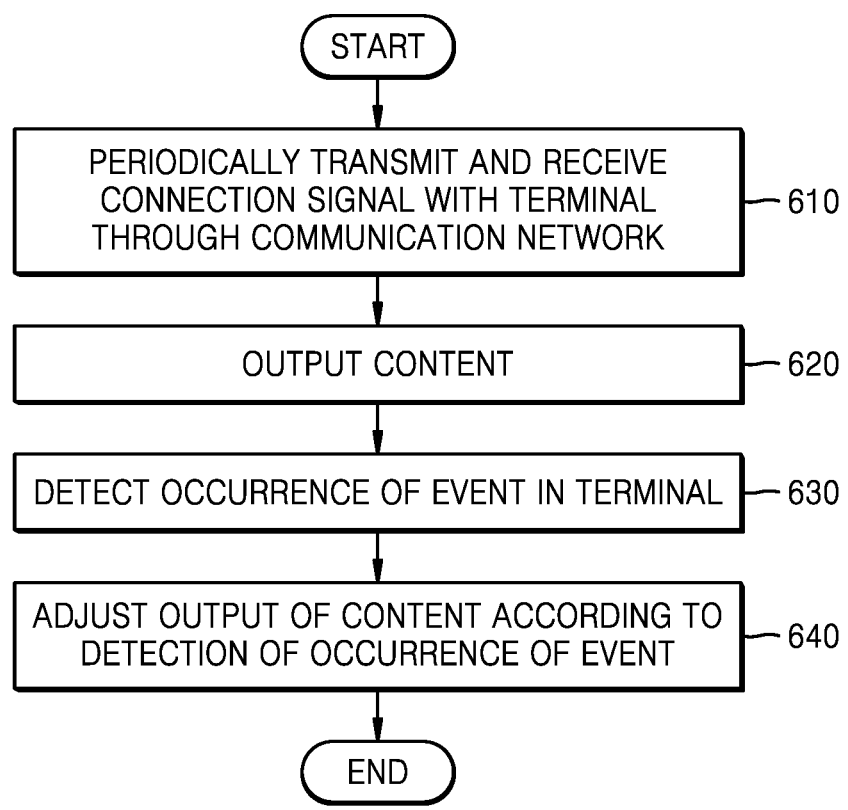
FIG. 6 is a flowchart illustrating an example method of adjusting output of content, according to an embodiment of the disclosure.

FIG. 6 is a flowchart illustrating an example method of controlling output of content, according to an embodiment of the disclosure.

The content reproducing apparatus 300 may periodically transmit and receive the connection signal with the terminal 340 through the communication network (operation 610). The content reproducing apparatus 300 may be connected to the terminal 340 through the communication network. The connection signal may include a first connection signal and a second connection signal. The content reproducing apparatus 300 may periodically transmit the first connection signal to the terminals 340 located nearby. Among the terminals located near the content reproducing apparatus 300, the terminal receiving the first connection signal may transmit, to the content reproducing apparatus 300, the second connection signal indicating that the signal has been normally received.

The content reproducing apparatus 300 may output content requested by the user on the screen (operation 620). The user may control the content reproducing apparatus 300 to make a request to output the desired content. The content reproducing apparatus 300 may request and receive the content requested by a user from an external terrestrial broadcasting station, an Internet broadcasting station, an external content provider, or the like through the communication network, or may extract the content from an internal or external memory of the content reproducing apparatus 300. The content reproducing apparatus 300 may output, on the screen, the content received from the server or extracted from the memory. In an embodiment of the disclosure, the content reproducing apparatus 300 may display the content output from the terminal 340 on the screen of the content reproducing apparatus 300 using a mirroring or casting technique. The mirroring or casting technique is a technique for displaying, on other peripheral devices, content to be displayed on the terminal 340.

The content reproducing apparatus 300 may detect that an event has occurred in the terminal 340 (operation 630). In an embodiment of the disclosure, when the content reproducing apparatus 300 receives an event occurrence signal from the terminal 340, the content reproducing apparatus 300 may detect that an event has occurred in the terminal 340. When the user makes a phone call or receives a phone call using the terminal 340, the terminal 340 may generate an event occurrence signal indicating that an event has occurred. The terminal 340 may transmit an event occurrence signal to the content reproducing apparatus 300.

In an embodiment of the disclosure, when the proximity to the terminal 340 obtained according to the second connection signal received from the terminal 340 is less than a preset value, the content reproducing apparatus 300 may detect that an event has occurred in the terminal 340. In an example, when the content reproducing apparatus 300 does not receive the second connection signal corresponding to the first connection signal from the terminal 340 for a certain time, the content reproducing apparatus 300 may determine that the proximity is less than the preset value because the terminal 340 moves away from the content reproducing apparatus 300, and may detect that an event has occurred in the terminal 340. In another example, even though the content reproducing apparatus 300 receives the second connection signal corresponding to the first connection signal from the terminal 340, when the strength of the second connection signal is weaker than a certain reference value, the content reproducing apparatus 300 may determine that the proximity is less than the preset value because the terminal 340 moves away from the content reproducing apparatus 300. When the proximity to the terminal 340 obtained according to the second connection signal is less than the preset value, the content reproducing apparatus 300 may detect that an event has occurred in the terminal 340.

When the content reproducing apparatus 300 detects the occurrence of the event, the content reproducing apparatus 300 may adjust the output of the content according to the detection (operation 640). In an embodiment of the disclosure, the content reproducing apparatus 300 may adjust the volume of the content. For example, when the user moves away from the content reproducing apparatus 300 by a certain distance or more while carrying the terminal 340, the content reproducing apparatus 300 may increase the volume of the content so that the user may use the audio of the content at a long distance. In another example, when the terminal 340 moves away from the content reproducing apparatus 300 by a predetermined distance or more, the content reproducing apparatus 300 may pause the output of the content. When the content reproducing apparatus 300 detects that an event occurs in the terminal 340 while outputting the screen of the terminal 340 by the mirroring or casting technique, the content reproducing apparatus 300 may be stopped by mirroring or casting.

In an embodiment of the disclosure, when the content reproducing apparatus 300 receives the event occurrence signal from the terminal 340, the content reproducing apparatus 300 may decrease the volume of the content or make the content silent. That is, when the content reproducing apparatus 300 detects that an event has occurred at a location not far from the content reproducing apparatus 300, for example, when the content reproducing apparatus 300 detects that the user makes the phone call using the terminal 340, the content reproducing apparatus 300 may reduce the volume of the audio or output the silent content so that the user may concentrate on the phone call. The content reproducing apparatus 300 may pause the output of the content, instead of adjusting the volume of the audio.

Figure 7:
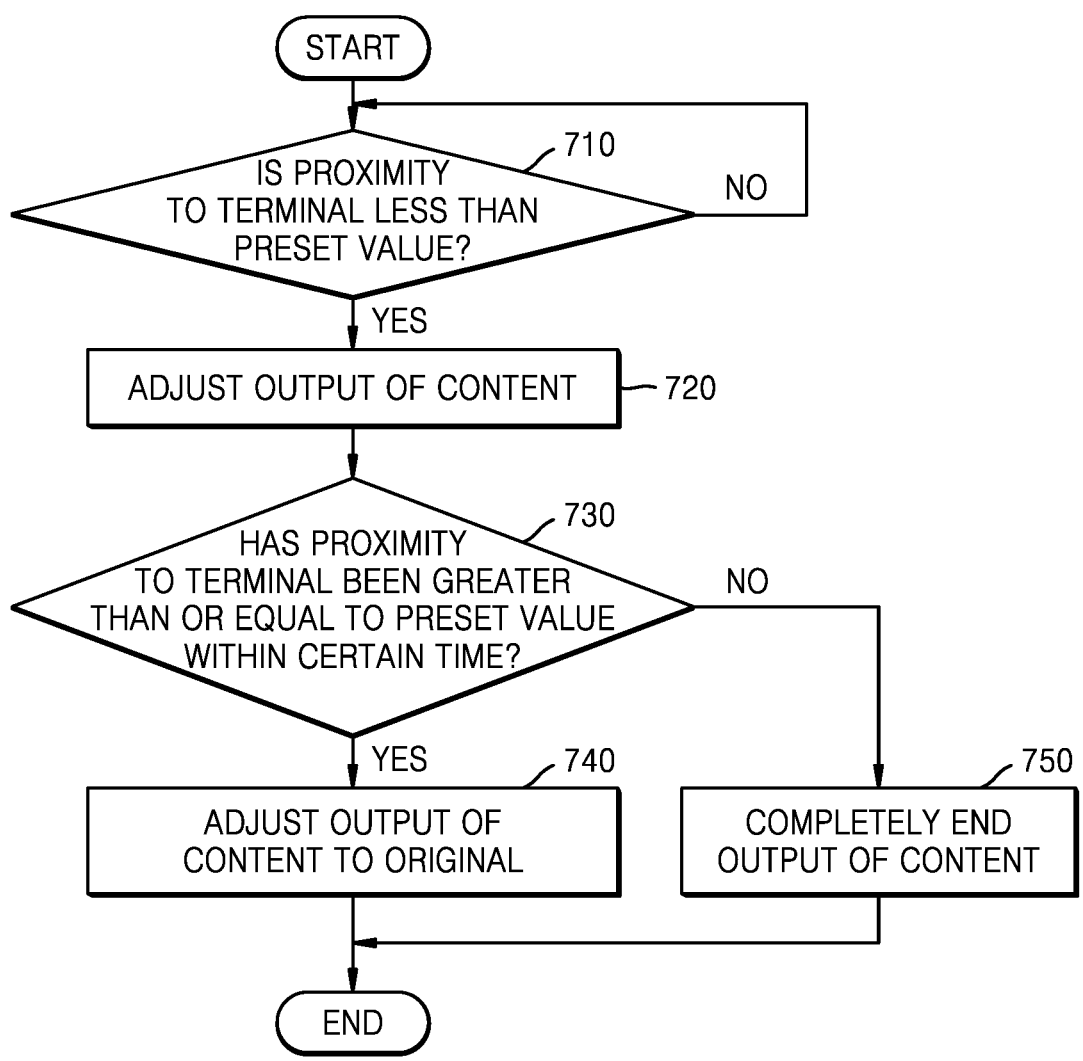
FIG. 7 is a flowchart illustrating an example method of adjusting output of content using proximity to a terminal, according to an embodiment of the disclosure.

FIG. 7 is a flowchart illustrating an example method of adjusting output of content using proximity to the terminal 340, according to an embodiment of the disclosure.

Referring to FIG. 7, the content reproducing apparatus 300 may measure a distance to the terminal 340. The content reproducing apparatus 300 may transmit and receive the connection signal with the terminal 340 connected through the communication network. That is, the content reproducing apparatus 300 may transmit the first connection signal to the terminal 340 located nearby and receive, from the terminal 340, the second connection signal indicating that the first connection signal has been received. The second connection signal is transmitted from the terminal 340 to the content reproducing apparatus 300, and may be an acknowledgement (ACK) signal for notifying the transmitting side that the first connection signal transmitted from the content reproducing apparatus 300 has been normally received. When the content reproducing apparatus 300 receives the second connection signal, the content reproducing apparatus 300 may know that the terminal 340 has normally received the first connection signal.

The content reproducing apparatus 300 may periodically transmit the first connection signal to the terminal 340 and may periodically receive, from the terminal 340, the second connection signal corresponding to the first connection signal.

The content reproducing apparatus 300 may continuously check whether the second connection signal is received from the terminal 340 within a certain time after transmitting the first connection signal to the terminal 340.

The content reproducing apparatus 300 may determine whether the proximity to the terminal 340 is less than a preset value (operation 710). In an embodiment of the disclosure, when the content reproducing apparatus 300 does not receive the second connection signal from the terminal 340 within the certain time after transmitting the first connection signal, the content reproducing apparatus 300 may determine that the proximity to the terminal 340 is less than the preset value. In an embodiment of the disclosure, when the content reproducing apparatus 300 receives the second connection signal from the terminal 340 within the certain time after transmitting the first connection signal, but the strength of the second connection signal is weaker than a reference value, the content reproducing apparatus 300 may determine that the proximity to the terminal 340 is less than the preset value.

The strength of the second connection signal is power (TxPower) of the second connection signal and represents the intensity of the second connection signal generated by the terminal 340. The power level is expressed in dBm unit, and the transmission power level in the Bluetooth communication may be in a range of −100 dbm to +20 dBm.

The content reproducing apparatus 300 may identify the distance between the terminal 340 and the content reproducing apparatus 300 according to the power value of the second connection signal. When the proximity to the terminal 340 is less than the preset value, the content reproducing apparatus 300 may detect that an event has occurred in the terminal 340.

The content reproducing apparatus 300 may adjust the content that is being output and output the adjusted content (operation 720). The content reproducing apparatus 300 may increase the volume of the content or pause the output of the content. The content reproducing apparatus 300 may start recording the content that is being output. In an embodiment of the disclosure, the content reproducing apparatus 300 may transmit, to the terminal 340, information about the content that is being output. The information about the content may include information such as a title of the content that is being output, a storage location of the content, or a reproduction position of the content that is being output. The storage location of the content may include information about a server providing the content. The terminal 340 may receive the information about the content from the content reproducing apparatus 300 and may use the information about the content to receive the content from the server providing the content and output the content. The terminal 340 may output the content after a point of the content that has been output by the content reproducing apparatus 300 using the reproduction position of the content that is being output, which is included in the information about the content.

The content reproducing apparatus 300 determines whether the proximity to the terminal 340 is greater than or equal to the preset value within the certain time (operation 730). The content reproducing apparatus 300 may count a certain time from a time point when the proximity to the terminal 340 is less than the preset value, and determine whether the proximity to the terminal 340 is increased to the original value within the counted time. When the proximity to the terminal 340 is greater than or equal to the preset value, the content reproducing apparatus 300 may detect that the event has ended in the terminal 340.

When the content reproducing apparatus 300 detects that the event has ended, the content reproducing apparatus 300 may adjust the output of the content to back again (operation 740). In an embodiment of the disclosure, when the content reproducing apparatus 300 increases the audio volume after detecting the occurrence of the event, the content reproducing apparatus 300 may output the content by adjusting the audio volume back again according to the end of the event. In an embodiment of the disclosure, when the content reproducing apparatus 300 pauses the output of the content after detecting the occurrence of the event, the content reproducing apparatus 300 may resume the output of the content according to the end of the event. In an embodiment of the disclosure, when the content reproducing apparatus 300 starts recording the content after detecting the occurrence of the event, the content reproducing apparatus 300 may stop recording the content according to the end of the event. In an embodiment of the disclosure, when the content reproducing apparatus 300 transmits, to the terminal 340, the information about the content that is being output after detecting the occurrence of the event and the terminal 340 subsequently outputs the content, the content reproducing apparatus 300 may receive information about a content reproduction time point from the terminal 340 according to the end of the event and may subsequently output the content after a time point when the terminal 340 outputs the content.

When the proximity to the terminal 340 continues to be less than the preset value within a certain time (operation 730), the content reproducing apparatus 300 may completely end the output of the content (operation 750). When the content reproducing apparatus 300 does not detect the end of the event in the terminal 340 within the certain time, the content reproducing apparatus 300 may determine that the user has no intention of using the content, completely end the output of the content, and output a default screen instead of the content, or may turn off the power of the content reproducing apparatus 300 so that the content reproducing apparatus 300 no longer operates.

Figure 8:
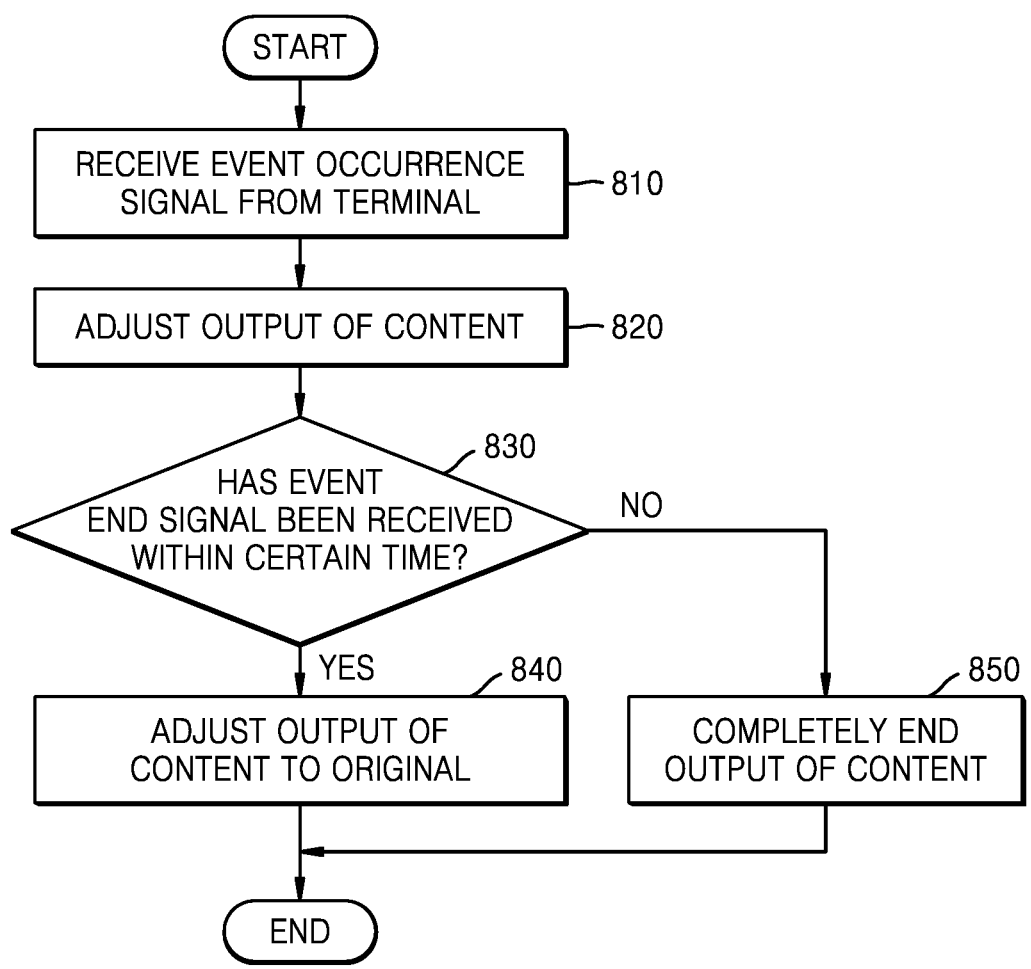
FIG. 8 is a flowchart illustrating an example method of receiving a signal for an event from a terminal and adjusting output of content, according to an embodiment of the disclosure.

FIG. 8 is a flowchart illustrating an example method of receiving a signal for an event from the terminal 340 and adjusting output of content, according to an embodiment of the disclosure.

The content reproducing apparatus 300 may receive an event occurrence signal from the terminal 340 (operation 810). In an embodiment of the disclosure, while carrying the terminal 340, the user may perform an action of receiving a phone call, making a phone call, or the like in a state of being located within a certain distance from the content reproducing apparatus 300. In this case, the content reproducing apparatus 300 may detect that a situation in which the user cannot use the content occurs. To this end, when the user makes a phone call or receives a phone call to start the phone call, the terminal 340 may generate an event occurrence signal indicating that an event has occurred. The terminal 340 may transmit the event occurrence signal to the content reproducing apparatus 300.

When the content reproducing apparatus 300 receives the event occurrence signal from the terminal 340, the content reproducing apparatus 300 may detect that an event has occurred in the terminal 340. After the content reproducing apparatus 300 detects that the event has occurred in the terminal 340, the content reproducing apparatus 300 may adjust the output of the content according to the detection (operation 820). In an embodiment of the disclosure, the content reproducing apparatus 300 may decrease the volume of the content that is being output, or may output only silent video on the screen.

When the user ends the phone call using the terminal 340 within a certain time, the terminal 340 may generate an event end signal indicating the end of the event and transmit the event end signal to the content reproducing apparatus 300. The content reproducing apparatus 300 may determine whether the event end signal has been received from the terminal 340 within a certain time after the occurrence of the event (operation 830).

When the content reproducing apparatus 300 receives the event end signal from the terminal 340 within the certain time, the content reproducing apparatus 300 may adjust the output of the content output back again (operation 840). In an embodiment of the disclosure, when the content reproducing apparatus 300 decreases the audio volume or makes the content silent after detecting the occurrence of the event, the content reproducing apparatus 300 may output the content by increasing the audio volume to the original volume according to the end of the event. In an embodiment of the disclosure, when the content reproducing apparatus 300 pauses the content after detecting the occurrence of the event, the content reproducing apparatus 300 may resume the output of the content according to the end of the event.

When the user continues the telephone call using the terminal 340, the content reproducing apparatus 300 may not receive the event end signal from the terminal 340. In this case, because the content reproducing apparatus 300 does not receive the event end signal from the terminal 340 within the certain time, the content reproducing apparatus 300 may completely end the output of the content (operation 850). In an embodiment of the disclosure, the content reproducing apparatus 300 may decrease the audio volume, completely end the content that is being silently output, or turn off the power of the content reproducing apparatus 300, so that the content reproducing apparatus 300 no longer operates.

Figure 9:
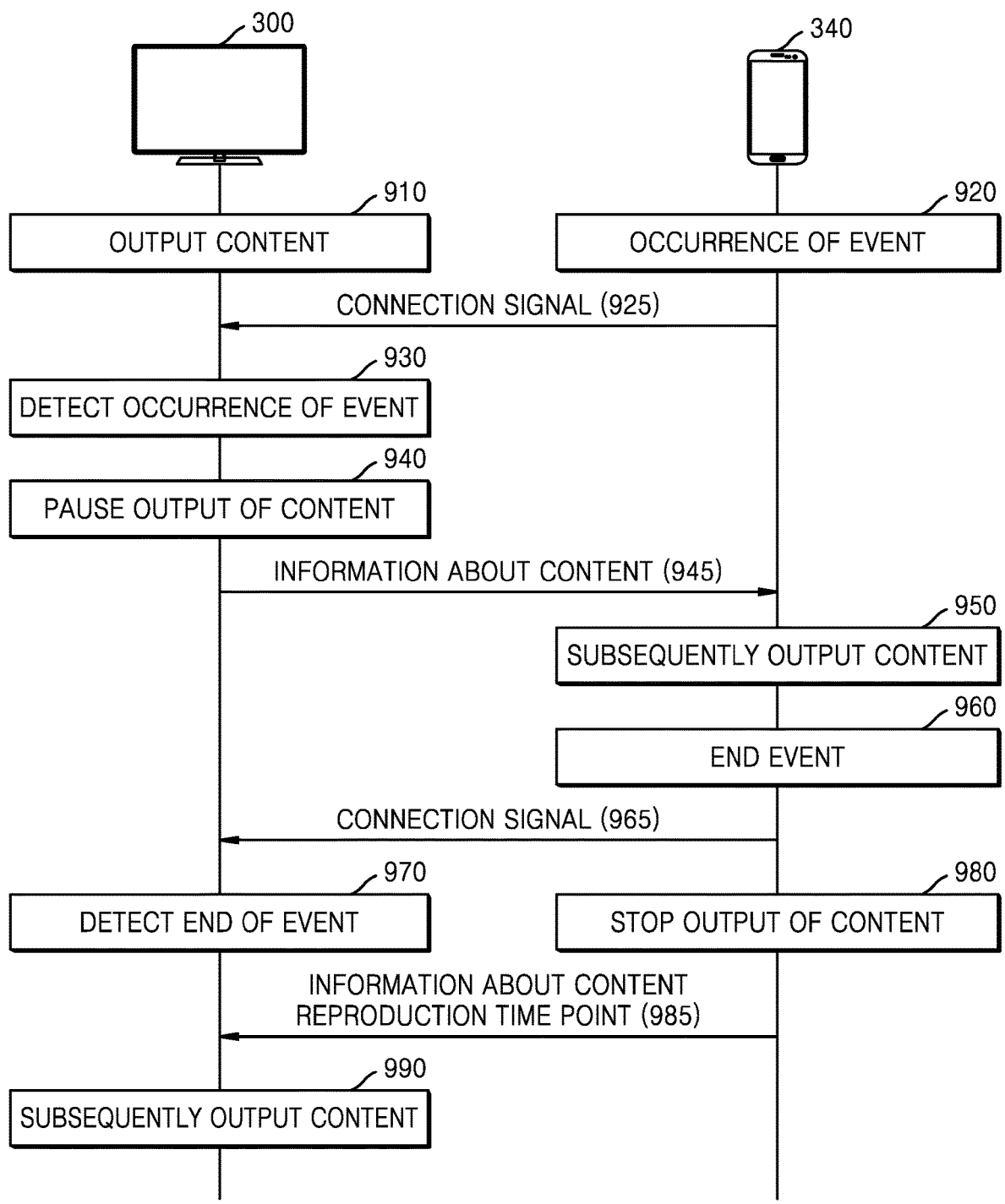
FIG. 9 is a signal flow diagram illustrating an example method by which a content reproducing apparatus and a terminal output content upon occurrence and end of an event of the terminal, according to an embodiment of the disclosure.

FIG. 9 is a signal flow diagram illustrating an example method by which the content reproducing apparatus 300 and the terminal 340 subsequently output content upon occurrence and end of an event of the terminal 340, according to an embodiment of the disclosure.

Referring to FIG. 9, the content reproducing apparatus 300 outputs content requested by a user (operation 910).

The user may carry the terminal 340 and move away from the content reproducing apparatus 300 by a certain distance or more. That is, an event may occur in the terminal 340 carried by the user (operation 920).

The content reproducing apparatus 300 may detect that an event has occurred in the terminal 340 using a connection signal 925 received from the terminal 340 (operation 930). In an embodiment of the disclosure, the content reproducing apparatus 300 may detect whether an event has occurred in the terminal 340 by periodically transmitting and receiving the connection signal with the terminal 340. When the content reproducing apparatus 300 transmits a first connection signal to the terminal 340 and does not receive, from the terminal 340, a second connection signal indicating the reception of the first connection signal within a certain time or when the reproducing apparatus 300 receives the second connection signal but the strength of the second connection signal is less than a reference value, the content reproducing apparatus 300 may determine that the proximity to the terminal 340 is less than a certain value, and determine that an event has occurred in the terminal 340. In an embodiment of the disclosure, the content reproducing apparatus 300 may detect that an event has occurred in the terminal 340 by receiving an event occurrence signal directly from the terminal 340.

After detecting the occurrence of the event, the content reproducing apparatus 300 may pause the output of the content according to the detection (operation 940). The content reproducing apparatus 300 may transmit information 945 about the content to the terminal 340.

The information 945 about the content may include a content identifier and content access information. In addition, the information 945 about the content may include information about the content reproduction time point.

The content identifier may be information capable of identifying the content, such as a title of the content reproduced by the content reproducing apparatus 300. The content identifier may be represented by a program ID or the like. For example, when the content is content of public TV or cable TV, the content is received in a transport stream (TS) packet, and the TS packet may include an electronic program guide or the like including broadcast program information. The broadcast program information included in the electronic program guide may include a broadcast program identifier and time information of the broadcast program.

For example, when the content is a signal received through Internet protocol television (IPTV) content or a video on demand (VOD) service, a content providing server may transmit program information including the program ID or the time information. The content reproducing apparatus 300 may extract the program ID from the TS packet or the program information from the content providing server, and provide the content identifier to the terminal 340 using the extracted program ID.

The content access information is information used to access the content and may be content location information such as a uniform resource locator (URL), an identifier of a content providing server that provides the content, or an identifier of a content providing application that provides the content. Examples of the content providing application may include Netflix, Tying, Amazon, or the like.

The information about the content reproduction time point is time information about the content that is being reproduced by the content reproducing apparatus 300 and may include information about a total content reproduction time and an elapsed reproduction time. The total content reproduction time may indicate the time taken to reproduce all the content, and the elapsed reproduction time may indicate the time that has elapsed from a content reproduction start time to a current time. The terminal 340 may use the elapsed reproduction time to determine, in real time, a point of the content that has been reproduced and watched by the user until now.

The terminal 340 may use the information 945 about the content to directly access a server that transmits the content. The terminal 340 may download the content from the accessed server or receive live streaming, and subsequently output the content from a time point when the content reproducing apparatus 300 has reproduced the content (operation 950).

While the terminal 340 reproduces the content, an event may end within a certain time after the occurrence of the event (operation 960). In an embodiment of the disclosure, when the user moves near the content reproducing apparatus 300 while carrying the terminal 340, the distance between the terminal 340 and the content reproducing apparatus 300 may be closer than a certain reference value. In this case, the terminal 340 may receive a first connection signal from the content reproducing apparatus 300 and transmit a second connection signal to the content reproducing apparatus 300. The terminal 340 may transmit, to the content reproducing apparatus 300, the second connection signal whose signal strength is greater than or equal to a certain value. The content reproducing apparatus 300 may receive a connection signal 965 from the terminal 340 and use the connection signal 965 to detect that the event has ended in the terminal 340 (operation 970).

After the event ends, the terminal 340 may stop outputting the content (operation 980). In addition, the terminal 340 may generate information 985 about a content reproduction time point and transmit the information 985 to the content reproducing apparatus 300. The information 985 about the content reproduction time point is time information about the content that is being reproduced by the terminal 340 and is information indicating a point of the content that has been reproduced by the terminal 340.

The content reproducing apparatus may detect the end of the event (operation 970), receive the information 985 about the content reproduction time point from the terminal 340, and know a point of the content that has been output by the terminal 340. The content reproducing apparatus 300 may subsequently output the content after a point of the content that has been output by the terminal 340 (operation 990).

Accordingly, even when the user watches the content reproducing apparatus 300 while carrying the terminal 340 and then moves away from the content reproducing apparatus 300 by a predetermined distance or more, the user may continue to use the content. In addition, when the user comes back near the content reproducing apparatus 300, the user may continue to use the content using the content reproducing apparatus 300.

Figure 10:
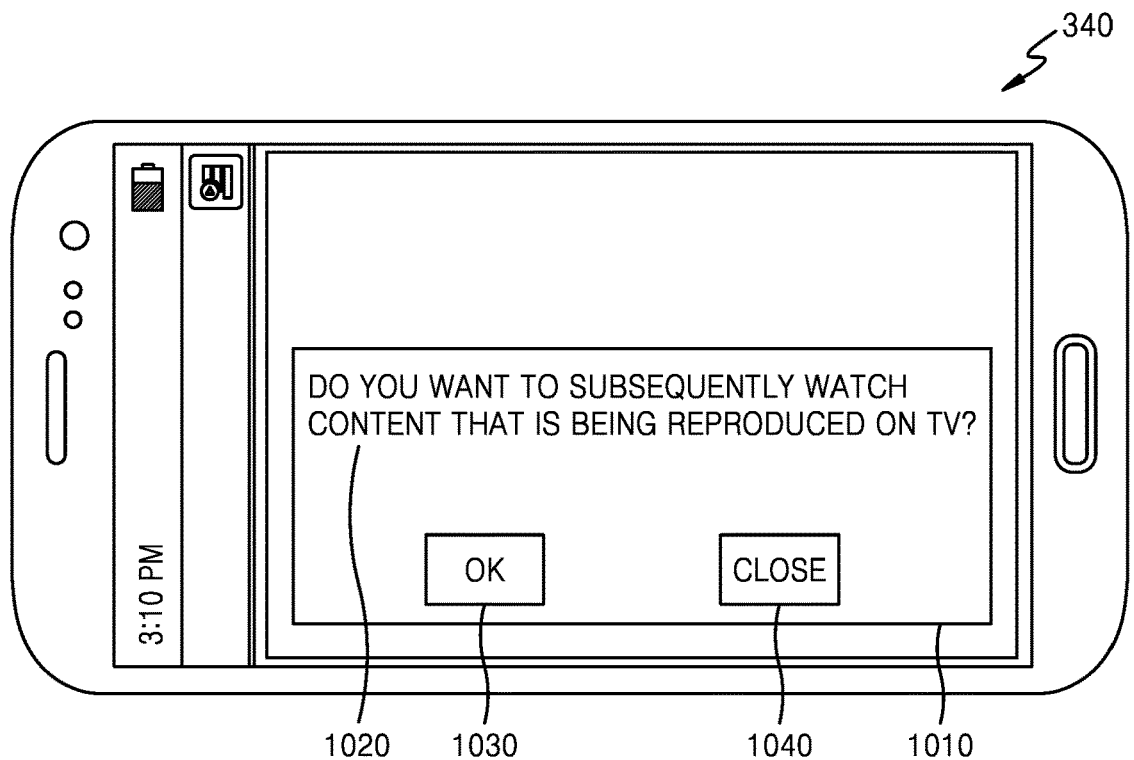
FIG. 10 is a diagram illustrating an example of a user interface that inquires about whether to subsequently reproduce content, which is output on a screen by a terminal, according to an embodiment of the disclosure.

FIG. 10 is a diagram illustrating an example of a user interface that queries whether to continuously reproduce content, which is output on a screen by a terminal, according to an embodiment of the disclosure.

When the content reproducing apparatus 300 uses the connection signal for the terminal 340 to determine that the terminal 340 deviates from the content reproducing apparatus 300 by a certain distance or more, the content reproducing apparatus 300 may determine that the user carrying the terminal 340 leaves an area that allows the watching of the content reproducing apparatus 300. In this case, the content reproducing apparatus 300 may inquire of the user about whether to subsequently watch the content through the terminal 340. The terminal 340 may inquire of the user about whether to subsequently watch the content by displaying a popup window asking whether to subsequently watch the content on the screen.

Referring to FIG. 10, the terminal 340 may output a user interface window 1010 on a screen. The user interface window 1010 may include a message 1020 "Do you want to subsequently watch content that is being reproduced on TV ?", an "OK" item 1030 that selects the subsequent reproduction of the content with respect to the inquiry, and a "close" item 1040 that closes the user interface window.

When the user selects the OK item 1030 in the user interface window 1010, the terminal 340 may access certain content of a certain server by referring to information about the content received from the content reproducing apparatus 300 and reproduce the accessed content.

The information about the content received from the content reproducing apparatus 300 may include a content identifier and content access information. Therefore, the terminal 340 may use the content access information and the content identifier to access a location where the corresponding content is located. For example, the content identifier may be a title of content "Me Before You" and the content access information may be a content provider name such as "Netflix." The terminal 340 may access the movie "Me Before You" through an application called Netflix and reproduce the movie.

In addition, because the information about the content may include information about the content reproduction time point, the terminal 340 may determine a point of the content that has been reproduced by the content reproducing apparatus 300. Because the terminal 340 is capable of reproducing the content after a point of the content that has been reproduced by the content reproducing apparatus 300, the user may subsequently watch the content, which has been watched on the content reproducing apparatus 300, without interruption even in a space away from the content reproducing apparatus 300.

Figure 11:
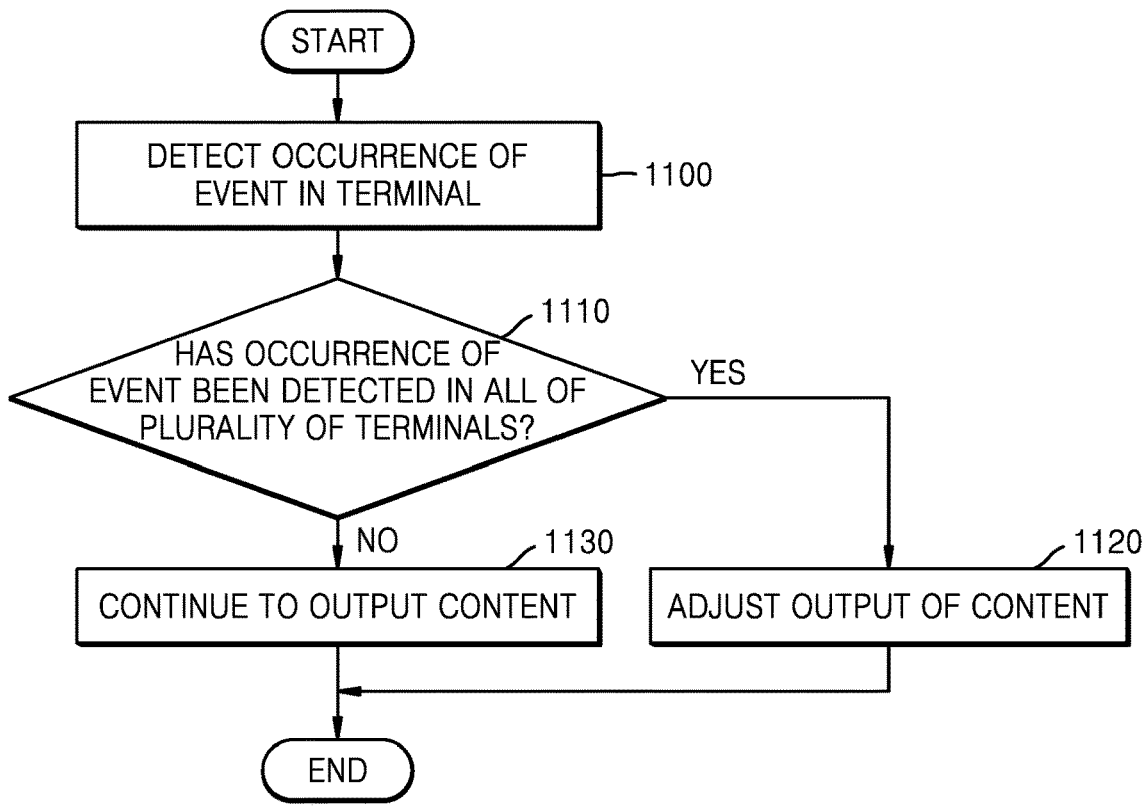
FIG. 11 is a flowchart illustrating an example method of adjusting output of content when a plurality of terminals are present, according to an embodiment of the disclosure.

FIG. 11 is a flowchart illustrating an example method of adjusting output of content when a plurality of terminals are present, according to an embodiment of the disclosure.

Referring to FIG. 11, the content reproducing apparatus 300 may be connected to the terminal 340 through the communication network. The content reproducing apparatus 300 may detect that an event occurs in the connected terminal 340 (operation 1100). When the terminal 340 moves away from the content reproducing apparatus 300 by a predetermined distance or more or when the user makes a phone call through the terminal 340, the content reproducing apparatus 300 may detect that an event has occurred in the terminal 340 using a reception or non-reception of a connection signal from the terminal 340, strength of the connection signal, or a reception or non-reception of an event occurrence signal from the terminal 340.

When a plurality of terminals 340 are present, the content reproducing apparatus 300 may be connected to each of the terminals 340 through the communication network and may transmit and receive a connection signal with each of the terminals 340. The content reproducing apparatus 300 may determine whether the connection signal is received from each of the terminals 340 or whether the strength of the received connection signal is greater than or equal to a certain reference value. In addition, the content reproducing apparatus 300 may receive an event occurrence signal from each of the terminals 340. In this manner, the content reproducing apparatus 300 may determine whether an event has occurred in each of the terminals 340 (operation 1110).

When the content reproducing apparatus 300 detects the occurrence of the event in all the terminals 340, the content reproducing apparatus 300 adjusts the output of the content (operation 1120). The content reproducing apparatus 300 may adjust the volume of the content or pause the output of the content. The content reproducing apparatus 300 may pause the output of the content and simultaneously transmit information about the content to the terminal in which the event has occurred, so that the terminal in which the event has occurred may subsequently output the content.

When the content reproducing apparatus 300 does not detect the occurrence of the event in all the terminals 340, that is, when the content reproducing apparatus 300 detects the occurrence of the event in some of the terminals 340, the content reproducing apparatus 300 continues to output the content (operation 1130). That is, in this case, the content reproducing apparatus 300 continues to output the content for the terminal 340 in which the event has not occurred. At the same time, the content reproducing apparatus 300 may transmit information about the content to the terminal 340 in which the event has occurred, so that the terminal in which the event has occurred may subsequently output the content.

The content reproducing apparatus and the content reproducing method according to some embodiments of the disclosure may be embodied in a storage medium including computer-executable instructions, such as computer-executable program modules. A non-transitory computer-readable medium may be any available medium which is accessible by a computer and may include any volatile/non-volatile media and any removable/non-removable media Furthermore, the non-transitory computer-readable medium may include any computer storage and communication media. The computer storage medium may include any volatile/non-volatile and removable/non-removable media embodied by a certain method or technology for storing information such as computer-readable instructions, data structures, program modules, or other data. The communication medium may typically include computer-readable instructions, data structures, program modules, other data of modulated data signals such as a carrier wave, or other transmission mechanism, and may include any information transmission medium.

Furthermore, the term "unit" as used herein may refer to a hardware component such as a processor or a circuit, and/or a software component that is executed by a hardware element such as a processor.

Moreover, the content reproducing apparatus and the content reproducing method according to the embodiments of the disclosure may be implemented as a computer program product including a recording medium storing a program for performing obtaining a sentence composed of multiple languages, obtaining vector values corresponding to each of words included in the sentence composed of the multiple languages using a multilingual translation model, converting the obtained vector values into vector values corresponding to a target language, and obtaining a sentence composed of the target language based on the vector values.

The content reproducing apparatus according to an example embodiment of the disclosure may detect whether the watching interruption situation has occurred and adjust the output of the content accordingly.

The content reproducing apparatus according to an example embodiment of the disclosure may detect whether the watching interruption situation has ended and adjust the output of the content back again accordingly.

The content reproducing apparatus according to an example embodiment of the disclosure may use the terminal to enable subsequent content usage when the watching interruption situation occurs.

The foregoing description is for illustrative purposes, and it will be understood by those of ordinary skill in the art that the disclosure may be easily modified into other specific forms without changing the technical spirit or essential features of the disclosure. Therefore, it should be understood that the above-described embodiments of the disclosure are illustrative in all aspects and are not limiting. For example, each element described as a singular form may be implemented in a distributed manner, and similarly, elements described as distributed may be implemented in a combined manner.

What is claimed is:

1. A content reproducing apparatus comprising:
   a communicator comprising communication circuitry configured to periodically wirelessly transmit and receive a connection signal with a mobile terminal;
   a content outputter comprising output circuitry configured to output content, the content outputter comprising a display configured to output an image included in the content and an audio outputter comprising audio output circuitry configured to output audio included in the content;
   a memory configured to store one or more instructions; and
   a processor configured to execute the one or more instructions stored in the memory:
   to obtain a distance to the terminal from the content reproducing apparatus based on the connection signal with the terminal,
   to identify whether the distance is greater than a certain distance or less than the certain distance,
   in response to that the identified distance is greater than a certain distance, to control the content outputter to adjust the output of the content based on a distance to the terminal from the content reproducing apparatus so that a still image is output by the display by pausing the output of the image or the audio with increased volume is output by the audio outputter,
   in response to that the identified distance to the terminal from the content reproducing apparatus is less than the certain distance within a reference time after the distance to the terminal from the content reproducing apparatus is greater than the certain distance, to control the content outputter to output the content as before the output of the content is adjusted, and
   in response to that the identified distance to the terminal from the content reproducing apparatus is not less than the certain distance within the reference time after the distance to the terminal from the content reproducing apparatus is greater than the certain distance, to control the output of the still image or the output with the increased volume is terminated completely by turning off the content reproducing apparatus.

2. The content reproducing apparatus of claim 1, wherein the processor is further configured to execute the one or more instructions to identify that the distance to the terminal is greater than the certain distance based on the connection signal not being received from the terminal for a certain time or a strength of the connection signal received from the terminal being weaker than a certain strength.

3. The content reproducing apparatus of claim 1, wherein the processor is further configured to execute the one or more instructions to identify that the distance to the terminal is less than the certain distance based on the connection signal being received from the terminal or based on strength of the connection signal received from the terminal being greater than or equal to certain strength.

4. The content reproducing apparatus of claim 1, wherein the processor is further configured to execute the one or more instructions to control the content reproducing apparatus to transmit, to the terminal, information about the content being output, such that some of a plurality of terminals access the content and subsequently output the content based on the distance to the terminal being greater than the certain distance.

5. The content reproducing apparatus of claim 4, wherein the processor is further configured to execute the one or more instructions to receive information about a content reproduction time point from the terminal and subsequently output the content after a point of the content that has been output by the terminal based on the distance to the terminal being less than the certain distance within a reference time after the distance to the terminal is greater than the certain distance.

6. The content reproducing apparatus of claim 1, wherein the processor is further configured to execute the one or more instructions to adjust the output of the content based on distances to all of a plurality of terminals being greater than the certain distance based on a plurality of terminals periodically transmitting and receiving the connection signal.

7. The content reproducing apparatus of claim 6, wherein the processor is further configured to execute the one or more instructions to, based on distances to some of the plurality of terminals being greater than the certain distance, transmit, to some of the plurality of terminals whose distances to the terminal are greater than the certain distance, information about the content that is being output, such that the some of the plurality of terminals access the content to subsequently output the content and simultaneously continues to output the content.

8. The content reproducing apparatus of claim 1, wherein the processor is further configured to:
adjust the output of the content based on distances to all of a plurality of terminals being greater than the certain distance based on a plurality of terminals periodically transmitting and receiving the connection signal, and
based on distances to some of the plurality of terminals being greater than the certain distance, transmit, to some of the plurality of terminals whose distances to the terminal are greater than the certain distance, information about the content that is being output, such that the some of the plurality of terminals access the content to subsequently output the content and simultaneously continues to output the content.

9. A content reproducing method performed by a content reproducing apparatus, the method comprising:
periodically wirelessly transmitting and receiving a connection signal with a terminal;
outputting content;
obtaining a distance to the terminal from the content reproducing apparatus based on the connection signal with the terminal;
identifying whether a distance to the terminal from the content reproducing apparatus is greater than a certain distance or less than the certain distance, based on the connection signal with the terminal;
adjusting output of the content based on the distance to the terminal from the content reproducing apparatus being greater than the certain distance,
wherein the content comprises an image and audio, and the adjusting of the output of the content comprises pausing output of the image so as a still image is output or increasing volume of the audio;
identifying whether the distance to the terminal from the content reproducing apparatus is less than the certain distance within a reference time after the distance to the terminal from the content reproducing apparatus is greater than the certain distance;
outputting the content as before the output of the content is adjusted based on the distance to the terminal from the content reproducing apparatus being less than the certain distance within the reference time; and
controlling the output of the still image or the output with the increased audio volume is terminated completely by turning off the content reproducing apparatus based on the distance to the terminal from the content reproducing apparatus being not less than the certain distance within the reference time.

10. The content reproducing method of claim 9, wherein the identifying of whether the distance to the terminal is greater than the certain distance comprises identifying that the distance to the terminal is greater than the certain distance based on the connection signal not being received from the terminal for a certain time or strength of the connection signal received from the terminal being weaker than certain strength.

11. The content reproducing method of claim 9, wherein the identifying of whether the distance to the terminal is less than the certain distance comprises identifying that the distance to the terminal is less than the certain distance based on the connection signal being received from the terminal or strength of the connection signal received from the terminal being greater than or equal to certain strength.

12. The content reproducing method of claim 9, further comprising, transmitting, to the terminal, information about the content being output based on the distance to the terminal being greater than the certain distance, such that some of the plurality of terminal access the content and subsequently output the content.

13. The content reproducing method of claim 12, further comprising:
receiving information about a content reproduction time point from the terminal based on the distance to the terminal being less than the certain distance within a reference time after the distance to the terminal is greater than the certain distance; and
using the information about the content reproduction time point to subsequently output the content after a point of the content that has been output by the terminal.

14. The content reproducing method of claim 9, wherein the adjusting of the output of the content comprises, based on a plurality of terminals that periodically transmitting and receiving the connection signal, adjusting the output of the content based on distances to all the plurality of terminals being greater than the certain distance.

15. A non-transitory computer-readable recording medium having recorded thereon a program for performing a content reproducing method by a content reproducing apparatus, the content reproducing method comprising:
periodically wirelessly transmitting and receiving a connection signal with a terminal;
outputting content;
obtaining a distance to the terminal from the content reproducing apparatus based on the connection signal with the terminal;
identifying whether a distance to the terminal from the content reproducing apparatus is greater than a certain distance or less than the certain distance, based on the connection signal with the terminal;
adjusting output of the content based on the distance to the terminal from the content reproducing apparatus being greater than the certain distance,
wherein the content comprises an image and audio, and the adjusting of the output of the content comprises pausing output of the image so as a still image is output or increasing volume of the audio;
identifying whether the distance to the terminal from the content reproducing apparatus is less than the certain distance within a reference time after the distance to the terminal from the content reproducing apparatus is greater than the certain distance;
outputting the content as before the output of the content is adjusted based on the distance to the terminal from the content reproducing apparatus being less than the certain distance within the reference time; and
controlling the output of the still image or the output with the increased audio volume is terminated completely by turning off the content reproducing apparatus based on the distance to the terminal from the content reproducing apparatus being not less than the certain distance within the reference time.

\* \* \* \* \*